(12) United States Patent
Helmeczi et al.

(10) Patent No.: US 10,011,972 B2
(45) Date of Patent: Jul. 3, 2018

(54) ADJUSTABLE EARTH SHAPING BLADE AND EARTH SHAPING APPARATUS

(71) Applicant: BRIDGEVIEW MANUFACTURING INC., Gerald (CA)

(72) Inventors: Raymond Helmeczi, Saskatchewan (CA); James Walter Wesley Kowch, Saskatchewan (CA)

(73) Assignee: BRIDGEVIEW MANUFACTURING INC., Gerald (CA)

( * ) Notice: Subject to any disclaimer, the term of this patent is extended or adjusted under 35 U.S.C. 154(b) by 23 days.

(21) Appl. No.: 14/736,705

(22) Filed: Jun. 11, 2015

(65) Prior Publication Data
US 2015/0361639 A1     Dec. 17, 2015

(30) Foreign Application Priority Data
Jun. 13, 2014   (CA) .................................. 2854176

(51) Int. Cl.
  *E02F 3/815*   (2006.01)
  *E02F 3/76*    (2006.01)
  *A01B 35/08*   (2006.01)

(52) U.S. Cl.
  CPC ............ *E02F 3/8155* (2013.01); *A01B 35/08* (2013.01); *E02F 3/7672* (2013.01)

(58) Field of Classification Search
  CPC ..... E02F 3/8155; E02F 3/7622; E02F 3/7618; E02F 3/7613; E02F 3/7672; E02F 5/02; E02F 5/025; A01B 35/08; A01B 31/00
  See application file for complete search history.

(56) References Cited

U.S. PATENT DOCUMENTS

| | | | | |
|---|---|---|---|---|
| 2,230,704 A | * | 2/1941 | Sorensen | E02F 3/7613 172/815 |
| 2,556,508 A | * | 6/1951 | Preston | E02F 3/8152 172/777 |
| 3,041,751 A | * | 7/1962 | Chattin | E02F 5/02 172/448 |
| 3,601,910 A | * | 8/1971 | Goltz | E02F 5/02 280/43.23 |
| 4,099,578 A | * | 7/1978 | Stevens | E02F 3/8155 172/815 |
| 4,479,312 A | * | 10/1984 | Turgeon | E01H 4/02 172/815 |
| 4,691,455 A | * | 9/1987 | Newman | E02F 5/02 37/347 |
| 4,834,191 A | * | 5/1989 | Vecchio | E02F 3/815 172/701.1 |

(Continued)

FOREIGN PATENT DOCUMENTS

CA           2742573        9/2011

OTHER PUBLICATIONS

Canadian Intellectual Property Office, Office Action for Application No. 2,854,176, dated Jan. 22, 2015, 5 pages.

*Primary Examiner* — Robert E Pezzuto
*Assistant Examiner* — Adam J Behrens
(74) *Attorney, Agent, or Firm* — Stetina Brunda Garred and Brucker

(57) ABSTRACT

An adjustable earth shaping blade comprises a center section and at least one side section pivotally attached to the center section at an oblique angle. The side section may be moved forwards or backwards in order to change the profile of the contacting edge of the adjustable earth shaping blade.

34 Claims, 35 Drawing Sheets

(56) References Cited

U.S. PATENT DOCUMENTS

| | | | |
|---|---|---|---|
| 5,411,102 A | | 5/1995 | Nickels et al. |
| 5,620,053 A | * | 4/1997 | Kamikawa ............ E02F 3/7618 |
| | | | 172/2 |
| 5,890,546 A | * | 4/1999 | Kerpash, Sr. .......... A01B 31/00 |
| | | | 172/397 |
| 6,021,853 A | * | 2/2000 | Atkins .................. E02F 3/7672 |
| | | | 172/456 |
| 6,843,001 B2 | * | 1/2005 | Jenne .................... E02F 3/7618 |
| | | | 37/93 |
| 7,100,311 B2 | * | 9/2006 | Verseef .................. E01H 5/066 |
| | | | 172/815 |
| 7,743,536 B2 | * | 6/2010 | Evans et al. .............. E01H 5/06 |
| | | | 172/273 |
| 8,732,993 B2 | * | 5/2014 | Hruska et al. ........ E02F 3/7604 |
| | | | 37/372 |
| 8,850,724 B2 | * | 10/2014 | Bloxdorf ................ E01H 5/067 |
| | | | 172/815 |
| 9,015,970 B1 | * | 4/2015 | Doucette ................ E02F 5/025 |
| | | | 37/444 |
| 9,388,544 B2 | * | 7/2016 | Reeves et al. .......... E01H 5/065 |
| 2005/0193602 A1 | * | 9/2005 | Osgood .................. E01H 5/066 |
| | | | 37/411 |
| 2012/0311894 A1 | * | 12/2012 | Hruska et al. ........ E02F 3/7604 |
| | | | 37/367 |

* cited by examiner

ADJUSTABLE EARTH SHAPING BLADE AND EARTH SHAPING APPARATUS

CROSS-REFERENCE TO RELATED APPLICATIONS

The current application claims priority to Canadian Patent Application 2,854,176 filed Jun. 13, 2013, the entirety of which is incorporated herein by reference.

STATEMENT RE: FEDERALLY SPONSORED RESEARCH/DEVELOPMENT

Not Applicable

BACKGROUND

The current disclosure is directed to an earth shaping apparatus, and in particular an earth shaping apparatus having an adjustable earth shaping blade.

Earth shaping apparatuses can be used for a number of purposes including, for example, leveling terrain, grading roads, digging trenches or ditches, creating berms or other purposes. Earth shaping apparatuses often have a contacting blade that is used to shape and move earth. An earth shaping apparatus is described in U.S. Pat. No. 8,732,993, which is incorporated herein in its entirety. In shaping the earth it may be necessary to make several passes of an area possibly with different apparatuses in order to form the earth into the desired feature.

It is desirable to provide an additional, alternative and/or improved earth shaping apparatus.

BRIEF SUMMARY

In accordance with the present disclosure, there is provided an adjustable earth shaping blade comprising: a center section comprising a center blade having a generally flat linear contacting edge for contacting the earth; and at least one adjustable side section pivotally connected to the center section, each of the at least one adjustable side section having a respective side blade having generally flat linear contacting edge for contacting the earth, a pivotal axis of the pivotal connection arranged at an oblique angle relative to the contacting edge of the center section.

In an embodiment the adjustable earth shaping blade may further comprise two adjustable side sections each pivotally connected to opposite sides of the center section.

In an embodiment the respective pivotal axis of each of the two side sections are arranged at the same angle relative to the contacting edge of the center section.

In an embodiment the pivotal axis of the at least one adjustable side section is arranged at an angle of between 15° and 75° relative to a horizontal plane of the contacting edge of the center section.

In an embodiment the angle of the pivotal axis is between 30° and 60°.

In an embodiment the angle of the pivotal axis is approximately 45°.

In an embodiment the center section further comprises a protective section having a frusto-conical shape covering the pivotal axis of each of the at last one adjustable side section, each of the at least one adjustable side section comprises a cut-out portion allowing the respective side section to rotate about the protective section.

In an embodiment each of the at least one adjustable side sections further comprise a wing extension extending from an end of the respective side section opposite the pivotal connection to the center section, the wing extension comprising a wing blade connected to the side blade and extending outward at a forward angle from the side blade.

In an embodiment each of the at least one adjustable side sections comprise a connection point for coupling a hydraulic cylinder to the respective adjustable side section.

In an embodiment each of the at least one adjustable side section may be pivoted about the respective pivotal axis to an up-turned position in which the contacting edge of the respective side blade extends forward and upward from the contacting edge of the center blade.

In an embodiment each of the at least one adjustable side section may be pivoted about the respective pivotal axis to a horizontal position in which the contacting edge of the respective side blade extends horizontally from the contacting edge of the center blade.

In an embodiment each of the at least one adjustable side section may be pivoted about the respective pivotal axis to an down-turned position in which the contacting edge of the respective side blade extends backward and downward from the contacting edge of the center blade.

In an embodiment the adjustable earth shaping blade may further comprise a frame connection for connecting the adjustable earth shaping blade to a support frame.

In an embodiment the adjustable earth shaping blade may further comprise a tow-point connection for connecting the adjustable earth shaping blade to a vehicle.

In accordance with the present disclosure, there is further provided an earth shaping apparatus comprising: a support frame comprising a plurality of wheels; and an adjustable earth shaping blade according to any one of claims 1 to 12 connected to the support frame.

In an embodiment the adjustable earth shaping apparatus may further comprise at least one blade-adjustment hydraulic cylinder coupled between the support frame and the at least one adjustable side section of the adjustable earth shaping blade.

In an embodiment the support frame comprises: a main frame for connecting the support frame to the adjustable earth shaping blade; a wheel support structure comprising a pivot arm pivotally connected to the main frame at a first end to allow the wheel support structure to pivot up and down; and an axle structure pivotally connected to the wheel support structure at a second end opposite the first end, a pivotal axis of the pivotal connection of the wheel support structure perpendicular to a pivotal axis of the pivotal connection of the wheel support to the main frame.

In an embodiment the support frame further comprises at least one height-adjustment hydraulic cylinder connected to the wheel support structure and the main frame.

In an embodiment the support frame further comprises at least one axle-tilt hydraulic cylinder connected to the axle structure and the wheel support structure.

In an embodiment the axle structure comprises the plurality of wheels mounted to telescoping tubes of the axle structure to allow a track width of the earth shaping apparatus to be adjusted.

In an embodiment the adjustable earth shaping apparatus may further comprise a tow hitch section connected to the adjustable earth shaping blade for pulling the earth shaping apparatus behind a tow vehicle.

In an embodiment the adjustable earth shaping apparatus may further comprise a ditching leg pivotally connected to the tow hitch section and moveable between: a retracted position in which the ditching leg is located above the contacting edge of the center section; and a ditching position in which a contacting edge of the ditching leg is located below the contacting edge of the center section.

In an embodiment the adjustable earth shaping apparatus may further comprise a wing position gauge comprising: a horizontal bar with inclination markings thereon; and a guide pin extending upwards from the at least adjustable side section, the guide pin indicating a position on the inclination markings as the at least one adjustable side section is pivoted about the pivotal axis.

In an embodiment the adjustable earth shaping apparatus may further comprise a land-level indicator comprising a weighted pendulum indicator providing an indication of positioning relative to horizontal.

In an embodiment the adjustable earth shaping apparatus may further comprise a blade-tilt indicator comprising an indicator controlled by a horizontal tilt of the center section.

In an embodiment the adjustable earth shaping apparatus may further comprise a blade height indicator indicative of a height of the center section.

In an embodiment the adjustable earth shaping apparatus may further comprise one or more Global Positioning System (GPS) mounts for mounting GPS sensors.

In an embodiment the earth shaping apparatus can be disassembled and transported in a plurality of intermodal shipping containers.

In accordance with the present disclosure there is further provided an earth shaping vehicle comprising: a vehicle; and an adjustable earth shaping blade.

BRIEF DESCRIPTION OF THE DRAWINGS

Embodiments are described herein with reference to the appended drawings, in which.

DETAILED DESCRIPTION

Figure 1:
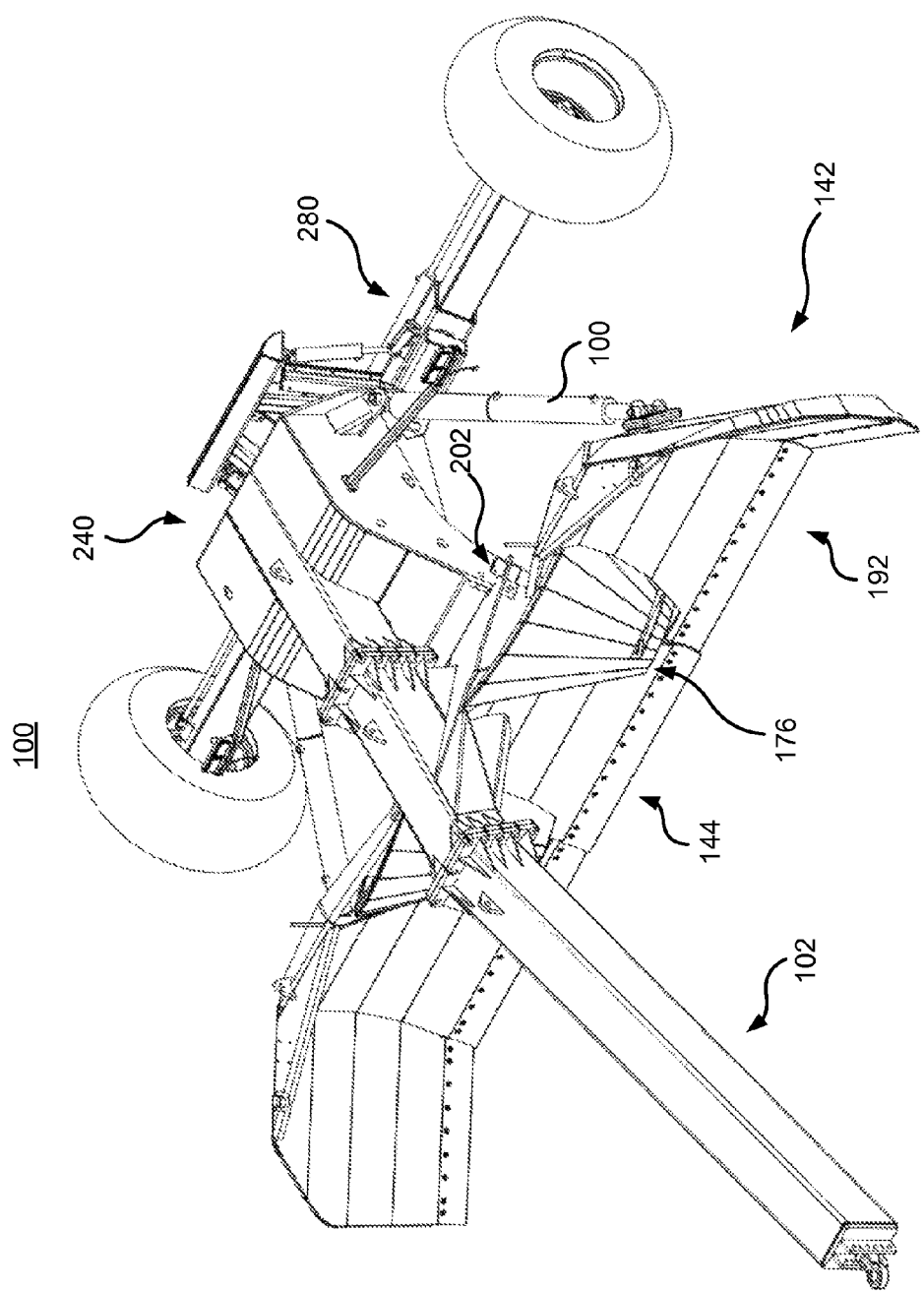
FIG. 1 depicts an isometric view of components of an adjustable earth shaping apparatus.

An adjustable earth shaping blade is described that allows earth to be shaped in different ways. The adjustable earth shaping blade may be pulled or otherwise driven over the earth with a contacting edge of the blade moving the earth. The profile of the contacting edge that shapes the earth may be adjusted as described further herein. The earth shaping blade comprises a center blade and pivotally connected side blades. The side blades are pivotally attached to the center blade at an angle, so that they can be pivoted upwards or downwards changing the profile of the contacting edge of the earth shaping blade. As depicted in FIGS. 14 through 34 the different profiles of the earth shaping blade allow the same earth shaping blade to create different profiles in the earth using the single earth shaping blade.

An earth shaping apparatus incorporating an adjustable earth shaping blade is described in detail with regard to FIGS. 1 through 13 which depict different aspects of the earth shaping apparatus. The earth shaping apparatus is substantially symmetric about its longitudinal length, and similar elements in the figures may only be identified on a single side of the adjustable earth shaping blade.

The earth shaping apparatus 100 comprises a tow hitch 102, an adjustable earth shaping blade 142 and a rear support section 240. The tow hitch 102 comprises a tow hitch box member 104 that has a rear mounting plate 106 at its rear end and an adjustable hitch mounting plate 110 at its front end. The adjustable hitch mounting plate has a number of mounting holes that allow a hitch point 112 to be mounted to the tow hitch 102 at different positions. The hitch point allows the earth shaping apparatus to be coupled to a tow vehicle, such as a tractor, in order to pull the earth shaping apparatus 100 in a ditching direction. The tow hitch 102 may also include one or more lifting points 108 in order to facilitate the manufacture and assembly of the earth shaping apparatus.

The rear mounting plate 106 of the tow hitch 102 allows the hitch to be connected to the adjustable earth shaping blade 142. The rear mounting plate 106 mates to a front mounting plate 150 of the adjustable earth shaping blade 142. The mounting plates 106, 150 can be secured to each other using bolts passing through aligned holes in the two mounting plates.

Figure 4:
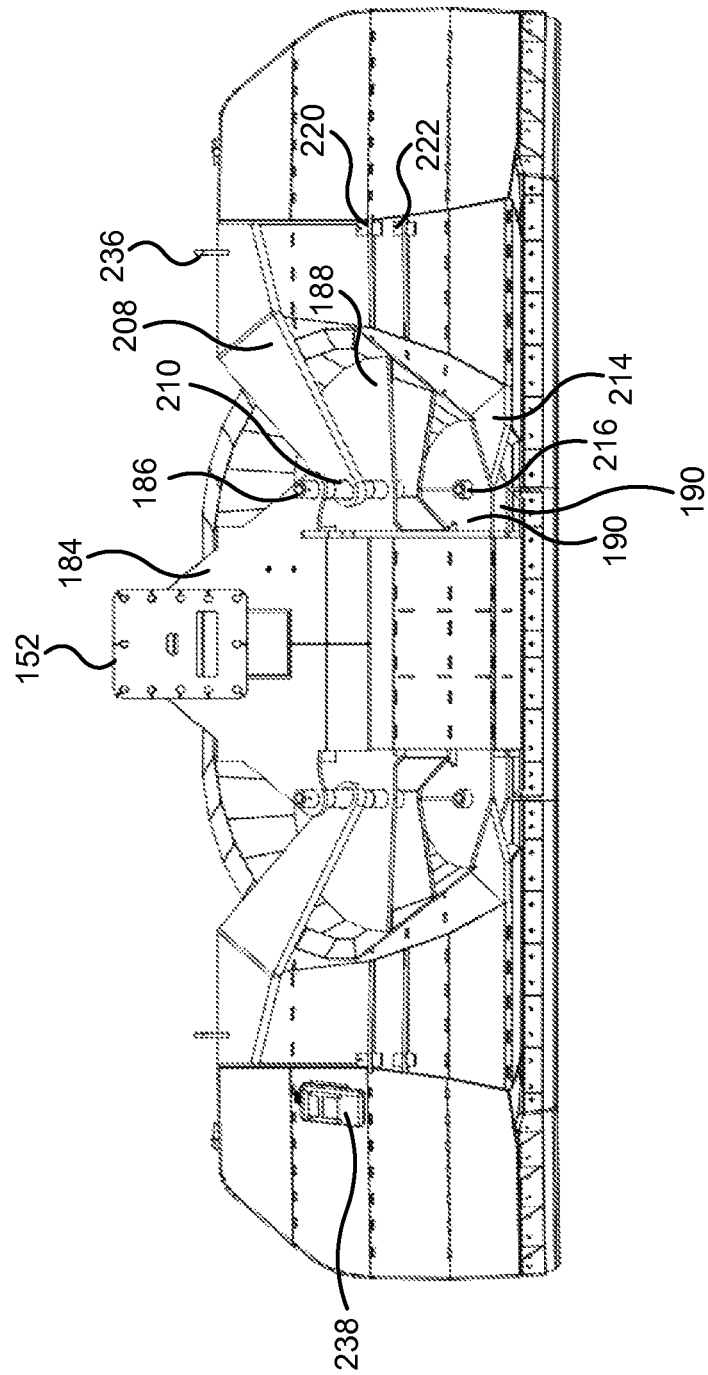
FIG. 4 depicts a rear view of the earth shaping blade.
Figure 5:
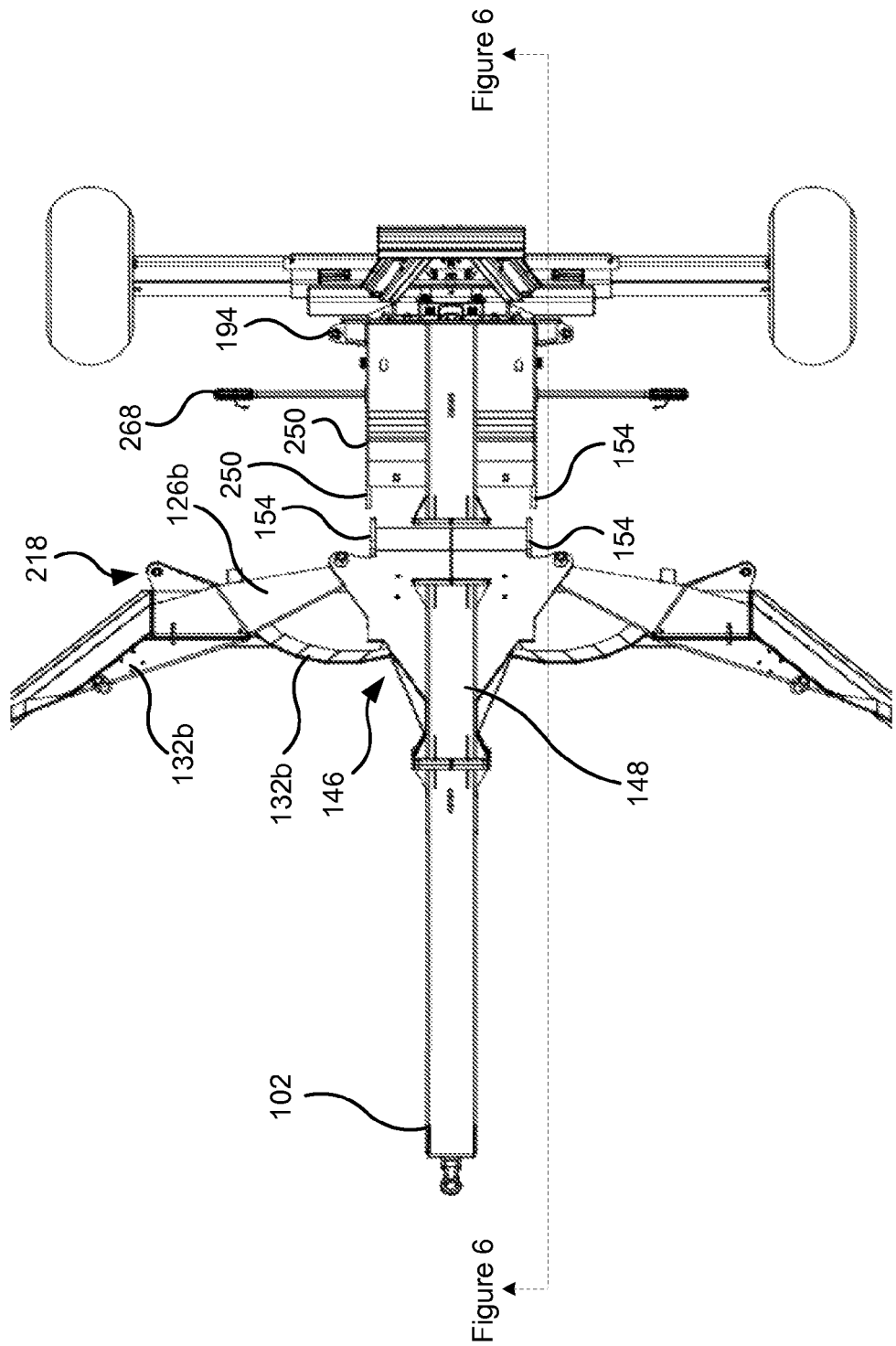
FIG. 5 depicts a partially exploded top view of the earth shaping apparatus.
Figure 6:
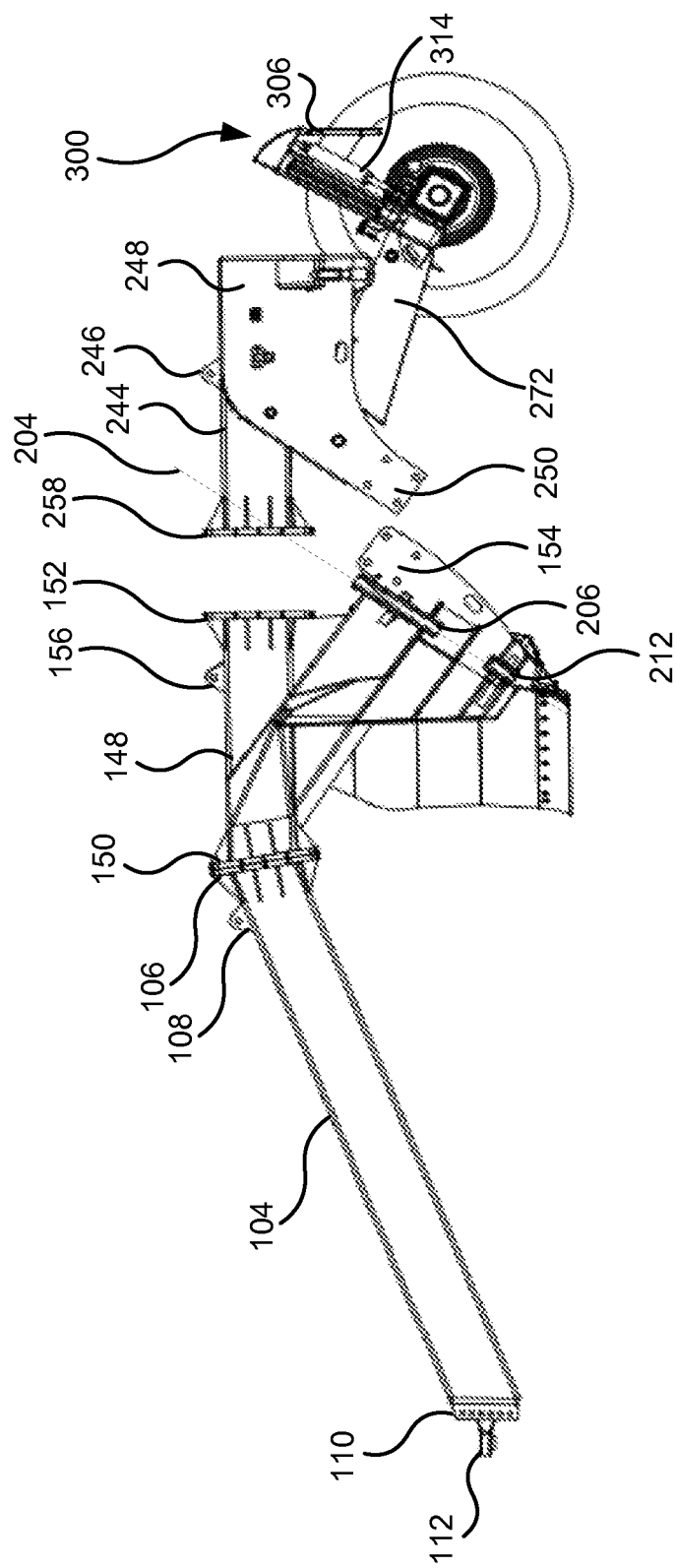
FIG. 6 depicts a side view cross section from FIG. 5.
Figure 7:
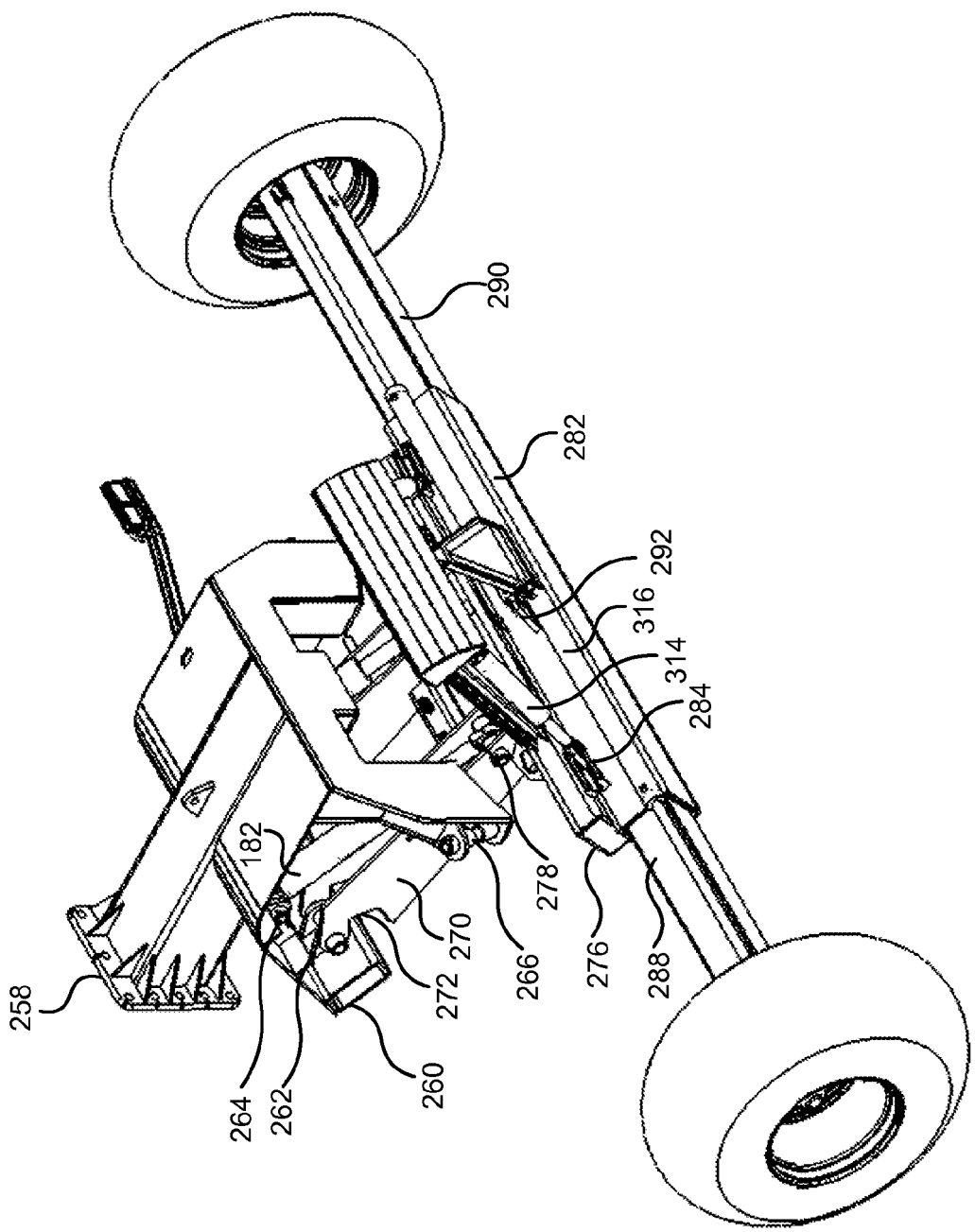
FIG. 7 depicts an isometric rear view of a rear support section in a first position with a side portion of the housing removed.
Figure 8:
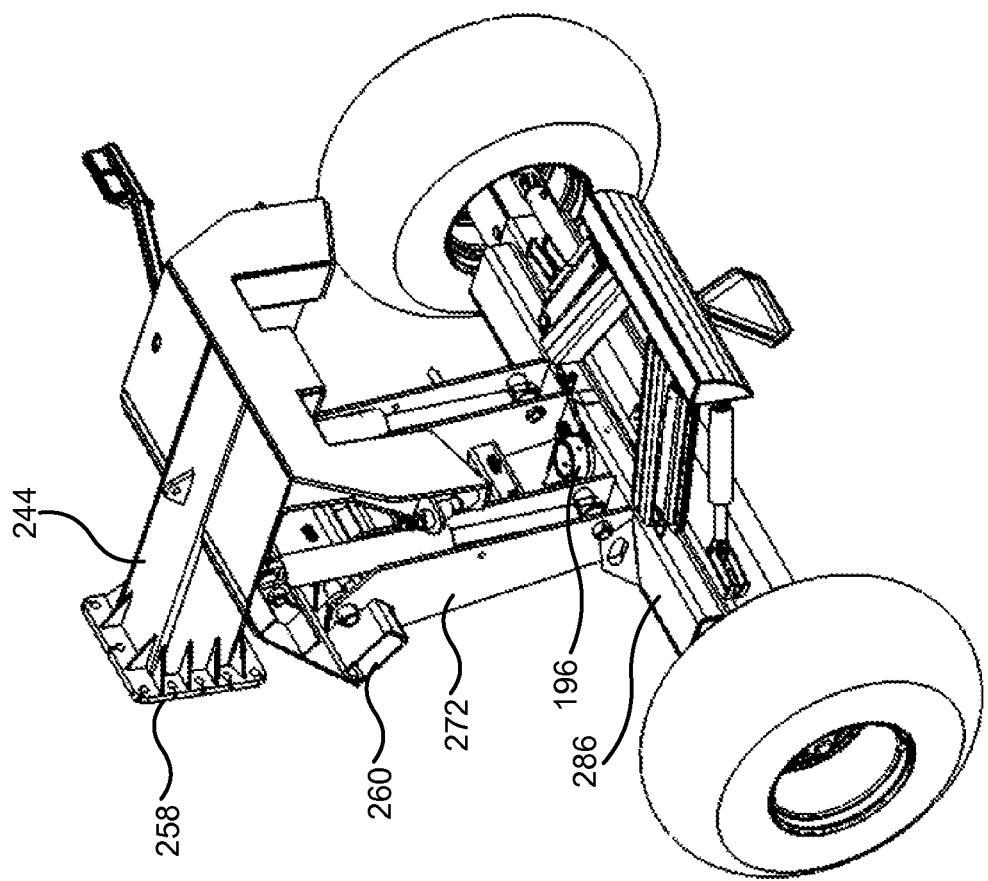
FIG. 8 depicts an isometric rear view of a rear support section in a second position with a side portion of the housing removed.

The adjustable earth shaping blade 142 comprises a center section 144 and two adjustable side sections 192, which are mirror images of each other. A pivotal connection 202 between the center section 144 and the side sections 192 is arranged at an oblique angle so that the contacting edges 198 of the side sections 192 can tilt upward or downward at an angle relative to a contacting edge 174 of the center section 144. The oblique angle of the pivot axis 204 relative to a vertical plane is depicted in FIG. 6. The pivot axis may be arranged at an angle of between about 15 to about 75 degrees from the vertical. The pivot axis 204 is approximately 30 degrees from the vertical in FIG. 6. The pivotal connection 202 may be provided by an upper pivotal connection 206 and a lower pivotal connection 212. As best depicted in FIG. 4, the upper pivotal connection is provided by an upper extension 208 extending from the side section 192 that has a pivot bushing 210. Corresponding pivot bushings 186 are supported by a top pivotal connection plate 184 and middle pivotal connection plate 188 of the center section. Similarly, the lower pivotal connection 212 of the adjustable side sections 192 comprises a lower extension 214 extending from the side section 192. The lower extension 214 has a pivot bushing 216 for mating with corresponding bushing of the center section. A pair of lower pivotal mounting plates 190 of the center section 144 with pivot bushings may be located above and below the lower extension 214 of the side section. The bushings of the upper and lower pivotal connections are aligned and a pivot pin 182, depicted in FIG. 2, can be secured through the bushings to secure the side sections 192 to the center section 144, while still allowing the side sections 192 to rotate about the tilted pivot axis 204.

Figure 35:
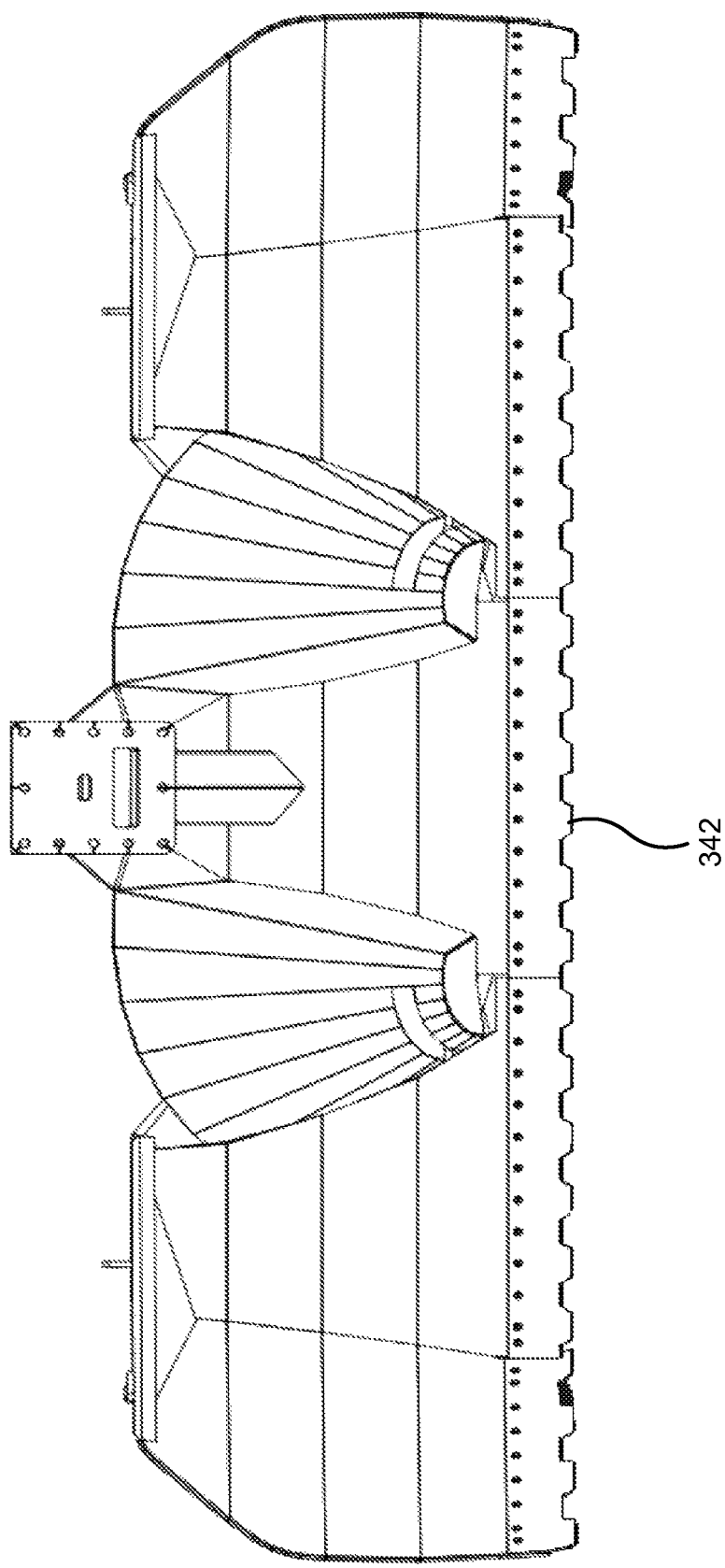
FIG. 35 depicts the earth shaping apparatus with serrated contacting edges.

The center section 144 comprises a center support frame 146 that includes a main center support box member 148. The center support box member 148 has the front mounting plate 150 for connecting the center section 144, and the adjustable earth shaping blade 142 as a whole, to the mounting plate 106 of the tow hitch 102. The center support box member further includes a rear mounting plate 152 opposite the front mounting plate 150. The rear mounting plate 152 connects the center section 144 of the earth shaping blade 142 to the rear support section 240. The center support frame 146 further comprises rear side mounting plates 154 which mate with corresponding side mounting plates 250 of the rear support section 240. The center section 144 further comprises a center blade 172 that has a lower contacting edge 174. The center blade 172 may be formed from a boxed frame of sheet metal for strength. The center blade 172 may have a convex shape in order to help with moving the overburden when shaping earth. The lower contacting edge 174 of the center blade 172 provides a substantially flat contacting edge and may be provided by replaceable blades. The blades may be flat, or may be serrated blades 342 as depicted in FIG. 35. The serrated blades may reduce the amount of horsepower needed to pull the adjustable earth shaping blade and/or provide an easier and faster dirt removal process.

Each of the adjustable side sections 192 are pivotally connected to the center section 144 at a tilted angle. The side sections 192 include pivot cut-out sections 200 that allow the side sections 192 to pivot about pivot point protectors 176. The pivot point protectors 176 prevent overburden earth from impacting the pivotal connections 202, as well as preventing the overburden from falling through the blade onto the cleared earth. The pivot point protectors 176 comprise a frusto-conical shaped frame 178 mounted in front of the pivotal connections. The frusto-conical shaped frame 178 includes a lower pivotal connection cut-out that allows the lower pivotal connection's 212 lower extension 214 to rotate through the pivot point protector 176. The upper extension 208 of the upper pivotal connection 206 can rotate above the frusto-conical shaped frame 178. This frusto-conical shaped piece can make it easier to pull the as it keeps the dirt rolling and not sitting in one spot. This frusto-conical shaped piece can also disperse the dirt evenly across the blade otherwise there could be uneven amount of dirt displaced across the side sections and center section.

The adjustable side sections 192 are each pivotally connected to the center section at an angle. The angled pivot axis 204 causes the adjustable side sections to pivot upwards or downwards, changing the grading profile of the adjustable earth shaping apparatus. Each of the adjustable side sections section has a respective straight section 194 comprising a blade 196 and a generally flat linear contacting edge 198. The blade of the straight section 194 includes the pivot cut-out portion 200 that allows the adjustable side section 192 to pivot around the pivot protection 176. The adjustable side section 192 includes a pivotal connection 202 to the center section 144 arranged at an oblique angle relative to the contacting edge of the center section. The pivotal connection 202 may be provided by an upper pivotal connection 206 and a lower pivotal connection 212. The upper pivotal connection 206 is provided by an upper extension 208 on the adjustable side section 192 that extends over the pivot cut-out section 200. The end of the upper extension 208 comprises a pivot bushing 210. The pivot bushing 210 is connected between pivot bushings 186 of a top pivotal connection plate 184 and middle pivotal connection plates 188. The top pivotal connection plate 184 and middle pivotal connection plates 188 are connected to the center support frame of the center section. In addition to providing the pivotal connection, the middle pivotal connection plates 188 may also provide a support structure for the frusto-conical section of the pivot protection 176. The lower pivotal connection 212 may be provided by a lower extension 214 extending from the adjustable side section 192 across the cut-out portion 200. The lower extension 214 is supported by lower pivotal connection plates 190 of the center section's center support frame 146. The lower pivotal connection cut-out 180 of the pivot protection 176 allows the lower extension 214 to rotate when the adjustable side section is pivoted about the pivot axis. The adjustable side sections 192 are secured to the center section by a pivot pin 182 that passes through the bushings of the pivotal connection. The adjustable side sections 192 further includes a connection point 218 for connecting an angle adjustment cylinder to. The connection point 218 is mounted towards the edge of the adjustable side section. The connection point 218 may comprise an upper connection bushing 220 and lower connection bushing 222. The angle adjustment cylinder can be connected between the upper and lower connection bushings. One or more of the adjustable side sections may also include a document or tool storage compartment 238.

In addition to the straight section 194, the adjustable side section 192 may further include extending wing sections 226. The wing sections 226 extend forward from the side of the adjustable side section 192. The wing section 226 comprise a wing gusset 232 to strengthen the connection between the wing section 226 and the straight section 194. The wing gusset 232 may include lifting points 236 as well as mounting points 234 for GPS sensors that can be used to determine the position of the adjustable side sections.

The adjustable earth shaping blade 142 may be connected to a rear support section 240 to allow the earth shaping blade 142 to be pulled by a tow vehicle. The rear support section 240 supports the adjustable earth shaping blade 142 on wheels. The rear support section 240 may also allow the height of the adjustable earth shaping blade 142 to be adjusted. The rear support section 240 may comprise a rear support frame 242 that connects the rear support section 240 to the adjustable earth shaping blade 142. A wheel support section 270 may be pivotally connected to the rear support frame 242. The wheel support section 270 may be pivoted under the rear support frame 242 in order to adjust the blade height.

The rear support frame 242 comprises a rear support box member 244 that includes a mounting plate 258 for connecting the rear support section 240 to the adjustable earth shaping blade. The rear support box member 244 may include lifting points 246 for lifting and moving the rear support section 240 during manufacture and/or assembly. The rear support frame 242 includes a rear support housing 248 connected to the rear support box member 244. The rear support housing 248 includes side mounting plates 250 that provide additional connection points for connecting the rear support section 240 to the adjustable earth shaping blade 142. The rear support housing 248 further includes connection points 266 on each side of the rear support housing 248 for the angle adjustment cylinder used to adjust the position of the adjustable side sections 192. The housing 248 may also include extensions 268 for road signals, such as brake lights and turn signals. The rear support frame 242 includes a transverse support bar 260 that provides a mounting point for a pivot point connections 262 of the wheel support section 270. The rear support frame 242 further includes mounting points for connecting 264 an end of hydraulic cylinders that are used in adjusting the height of the blade.

The wheel support section 270 is pivotally connected to the rear support frame 242 so that the wheels 296 can be rotated under the rear support frame 242 in order to raise the rear support frame 242 and the attached adjustable blade 142. The blade 142 may be lowered by rotating the wheels 296 outwards from under the rear support frame 242. The wheel support section includes pivotal arms 272 that each include box member cut-outs 274 that can receive the support bar 260 of the rear support frame 242 in order to allow the wheel support section 270 to rotate under the rear support frame 242 even if the pivot point 262 is located on a top side of the support bar 260. A cross member 276 joins the two pivotal arms 272 at an end of the pivotal arms opposite the pivotal connection to the rear support frame 242. A connection point for the hydraulic cylinders used to adjust the blade height may be located on the pivotal arms 272 or the cross member 276 of the wheel support section 270.

The wheel support section 270 further includes an axle section 280 that carries the wheels 296. The axle section 280 is pivotally mounted to the cross member 276. The pivot axis of the axle section is approximately perpendicular to the pivotal connection 262 between the wheel support section 270 and the rear support frame 242. The pivotal connection 262 between the rear support frame 242 and the wheel support section 270 allows the wheels to be pivoted under or out from under the rear support frame 242, while the pivotal connection of the axle section 280 to the cross member 276 allows the angle of the adjustable blade relative to the ground to be adjusted. Pivoting of the axle section 280 moves one wheel upwards, while the other wheel moves downwards.

The axle section 280 comprises telescoping members that are used to mount the wheels to and allow the track width to be adjusted. An outer telescopic tuber 282 is used to pivotally connect the axle section to the cross member 276. An axle pivot tube 286 is secured to the outer telescopic tube 282. The axle pivot tube 286 is received within a axle pivot bushing 298 of the cross member 276. An axle pivot tube cap may be secured to an end of the axle pivot tube protruding through the axle pivot bushing 298 in order to secure the axle section to the cross member 276. The outer telescopic tube 282 may also include connection points 284 for connecting hydraulic cylinders used to rotate the axle section 280. The hydraulic cylinders may operate in opposite directions so that as one end of the outer telescopic tube 282 is rotated upwards, the other end is rotated downwards.

Figure 12:
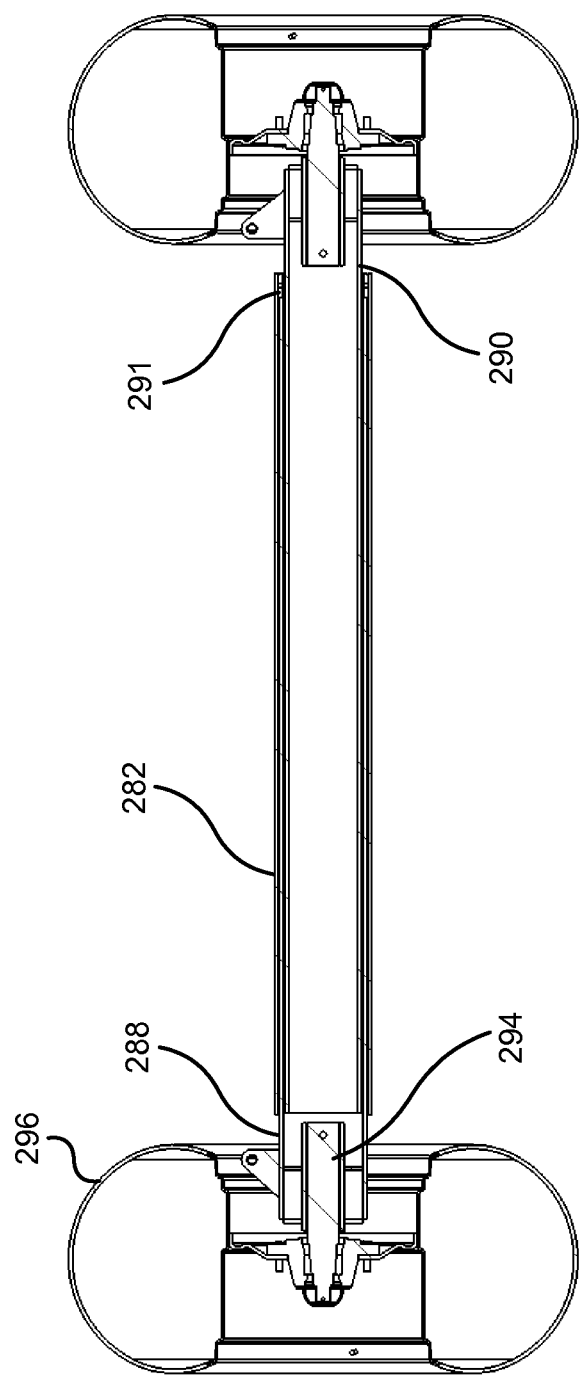
FIG. 12 depicts a detail cross section of a rear axle.

Inner telescoping tubes are located within the outer telescoping tube 282 and can be extended out of the outer telescopic tube 282 in order to widen the track width. A left inner telescopic tube 288 may be received within the outer telescopic tube 282 and a right inner telescopic tube 290 may be received within the left inner telescopic tube 288. A spacing bushing 291 as depicted in FIG. 12 may be located within the outer telescopic tube 282 and supports the right inner telescopic tube 290. The spacing bushing 291 has the approximate thickness of the left inner telescopic tube 288. Each of the telescopic inner tubes 288, 290 have a respective axle 294 for mounting wheels 296. The inner telescopic tubes 288, 290 include connection points for connecting to hydraulic cylinders used to adjust the track width. The opposite ends of the track width adjustment cylinders may be mounted to connection points 292 on the outer telescopic tube 282.

The wheel support section 270 further includes an axle rotation cylinder support tower 300. The support tower 300 provides connection points 308 for securing the hydraulic cylinders used to rotate the axle section 280. The support tower 300 may comprise vertical members 302 connected by a horizontal member 304. The cylinder connection points 308 may be connected to the horizontal member 304. A slow moving vehicle sign 306 may be pivotally connected to the support tower 300. The pivotal connection allows the slow moving vehicle sign 306 to hang down vertically regardless of the position of the wheel support section 270.

Figure 9:
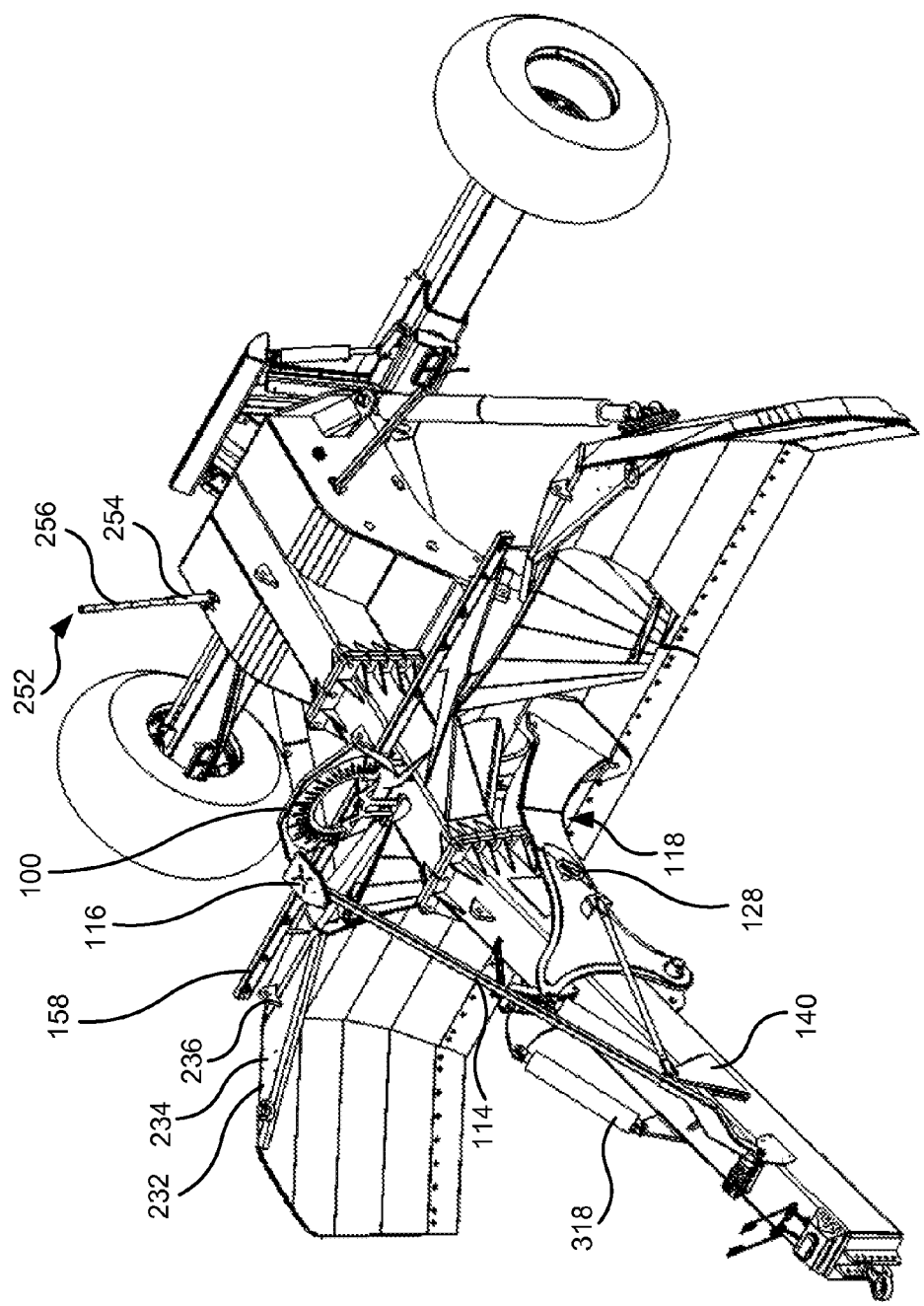
FIG. 9 depicts an isometric view of the earth shaping apparatus with additional components.
Figure 10:
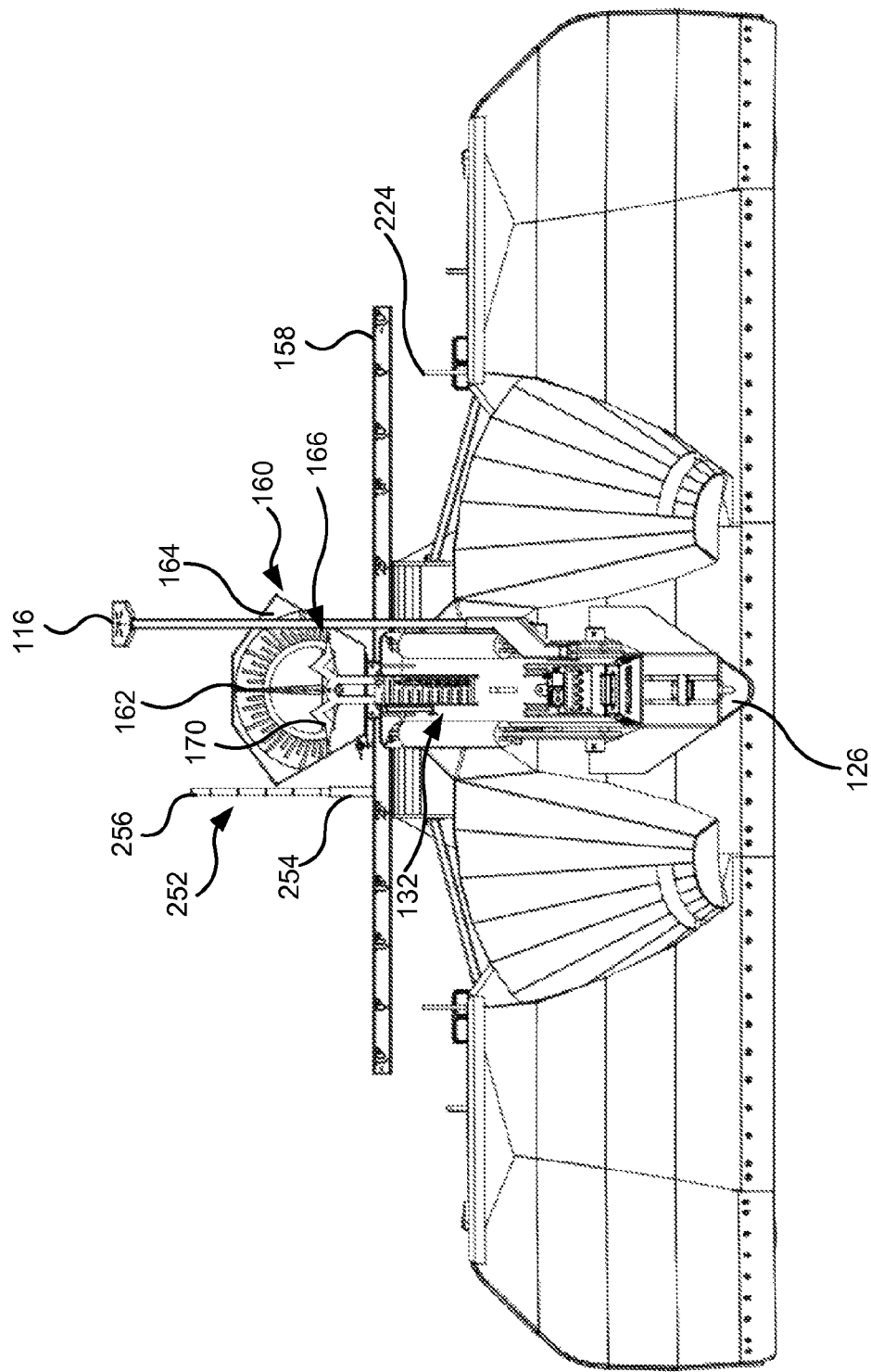
FIG. 10 depicts a front view of the earth shaping apparatus of FIG. 9.
Figure 11:
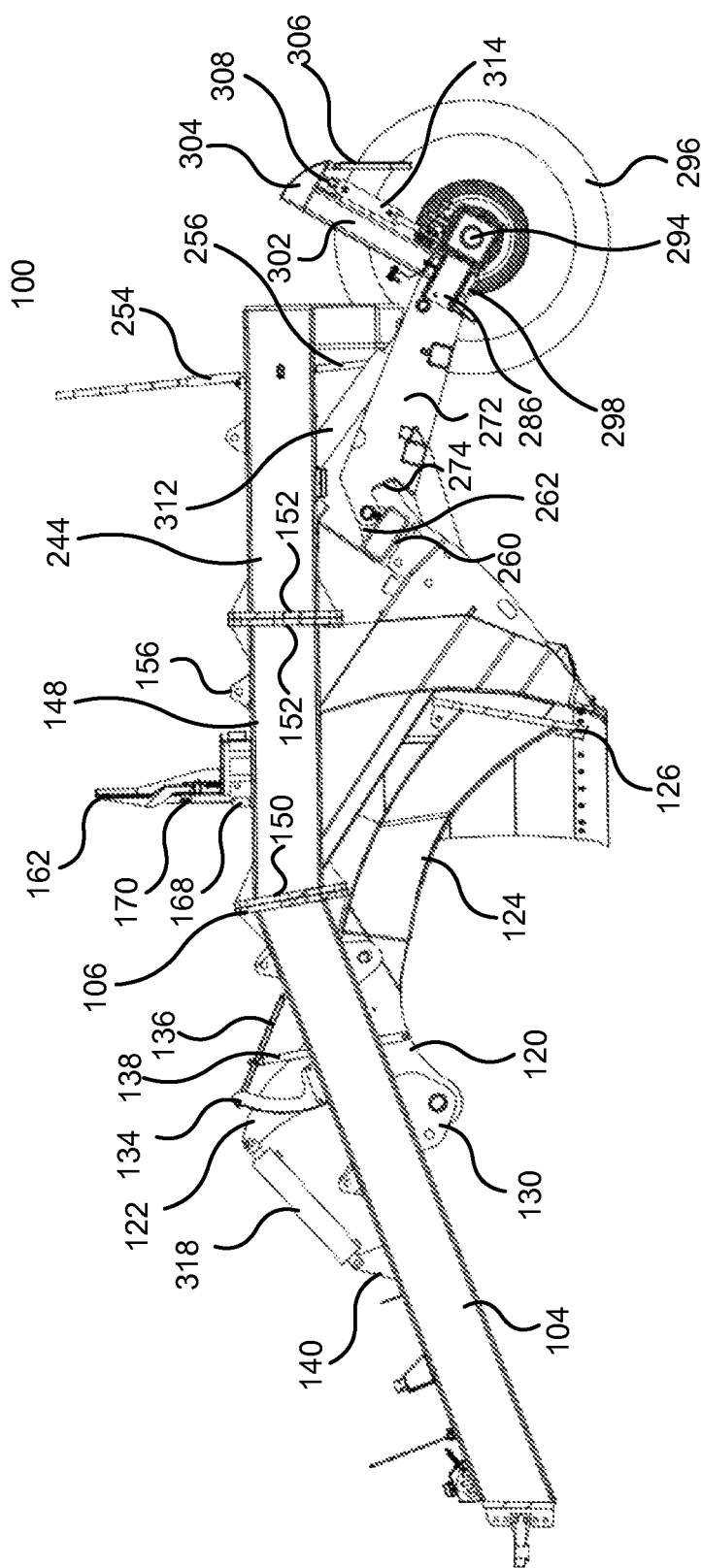
FIG. 11 depicts a side view cross section of the earth shaping apparatus of FIG. 9.

As depicted in FIG. 9-11, the earth shaping apparatus may also include a ditching leg 118. The ditching leg can be a ditching leg as described in U.S. Pat. No. 8,732,993, which is incorporated herein in its entirety. The ditching leg 118 may be moved between a retracted position in which it does not contact the earth and a ditching position in which it forms a ditch in the earth. The ditching leg 118 has a 'Y' shape with a pivotal connection arm 120 and a cylinder connection point arm 122 connected to a ditching leg frame 124. The pivotal connection arm 120 connects the ditching leg to the tow hitch 102 at respective pivotal connection points 130 of the tow hitch 102. The cylinder connection point arm 122 is used to connect hydraulic cylinders to the ditching arm 118 and connection points 140 on the tow hitch. The ditching leg 118 includes a ditching plate 126 that provides a generally 'V' shaped profile for providing a ditch.

Figure 13:
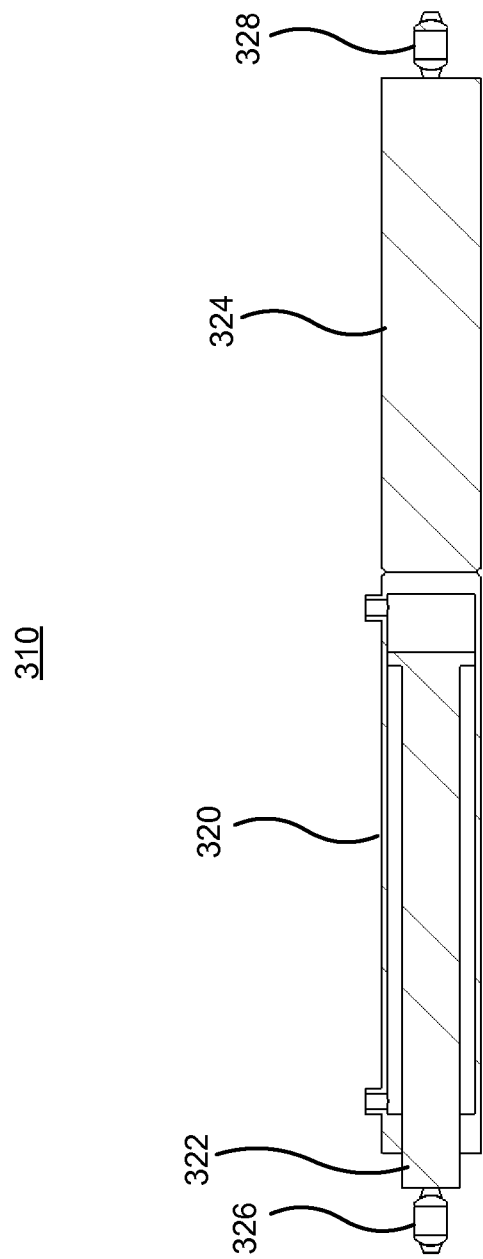
FIG. 13 depicts a detail of an extended adjustment cylinder.

A number of hydraulic cylinders are used to adjust the various components of the adjustable earth shaping apparatus. In particular, there are a pair of hydraulic cylinders 310 that are connected between the adjustable side sections 192 and the rear support frame 242. In order to provide a cylinder that is long enough to connect between the two connection points 218,266 while limiting the cylinder movement so that the side sections 192 are only moved within an allowable range, the side section adjustment cylinders 310 may have an extended housing as depicted in FIG. 13. The adjustment cylinder 310 may comprise a cylinder housing 320, in which a piston 322 moves. The piston movement is limited by the length of the cylinder housing. The piston movement should be sufficient to move the side sections between a fully forward position and a fully rearward position, while not over-extending or retracting the side sections. The length of the cylinder housing 320 may not be sufficient to connect the cylinder between the two connection points and as such an extension housing 324 may be provided in order to provide additional length to the adjustment cylinder, without adding additional movement to the piston 322, which could result in damage to the adjustable side sections 192. Connection points 326, 328 that allow movement of the connection about two axis are provided at each end of the adjustment cylinder 310.

Additional adjustment cylinders are provided to adjust the position of other components of the adjustable earth shaping apparatus. These may include a pair of height adjustment cylinders 312 mounted between connection points 264, 278 of the rear support frame 242 and the wheel support section 270. A pair of rotation adjustment cylinders 314 for adjusting the rotation of the wheels is connected between connection points 284, 308 of the wheel support section's cross member 276 and axle section 280. A pair of track width adjustment cylinders 316 are connected between connection points on the inner telescopic tubes 288, 290 and the outer telescopic tubes 282. The track width adjustment cylinders 316 may be used to adjust the width of the wheels 296.

The adjustable earth shaping apparatus 100 may further comprise a number of position meters that provide an indication of the position of the different components. The meters may include a height meter indicating a height of the blade, side section angle meters indicating respective positions of the adjustable side sections 192, a blade angle meter indicative of an angle of the center section relative to the ground and a ground angle meter indicative of a horizontal level of the ground.

The height meter 252 may be provided in the rear support section 240. A pivotal guide tube 254 is mounted to the top surface of the rear support housing 248. A moveable height gauge 256 is connected to the pivotal arm 272 of the wheel support section 270. The moveable height gauge 256 passes through the pivotal guide tube 254 and extends past the top of the tube 254. As the height is adjusted, the distance between the pivotal arms 272 and the top of the rear support housing 248 changes, and as such the amount of the moveable height gauge 256 extending past the housing 248 changes, providing a visual indication of the height of the blade.

Side section angle meters provide an indication of the position of the side sections. The side section angle meters may comprise a horizontal bar gauge mounted to the center section with markings indicating positions of the side sections. Each side section may include an adjustment angle indicator 224. As the position of the side section is adjusted, the adjustment angle indictor 224 moves to point to a position on the bar gauge providing an indication of the side section's position.

A ground angle meter 166 provides an indication of horizontal ground. The ground angle meter 166 may be mounted to the center section and comprises a weighted pendulum 168 that is free to rotate about a horizontal pivot axis. A horizontal indicator 170 is connected to the weighted pendulum, which remains in a horizontal position, due to the weight of the pendulum 168 regardless of the angle of the center section.

A blade angle meter 160 provides an indication of the angle of the center section relative to the ground. The blade angle meter 160 comprises a moveable angle indicator 162, which may be for example a dial indicator, that is moveable based on the position of the rotational adjustment hydraulic cylinders 314. As the rotational cylinders are adjusted, the moveable angle indicator 162 rotates and points to a position on a surrounding angle gauge 164. The blade angle meter 160 and the ground angle meter 166 may be located such that the pivot point of the moveable angle indicator 162 is arranged close to the approximate center of the horizontal indicator 170 in order to facilitate a comparison between the ground angle and the blade angle. When the contacting edge of the blade is parallel to the ground, the moveable angle indicator 162 will be perpendicular to the horizontal indicator 170.

A ditching depth meter 132 may be mounted on the tow hitch 102 in order to provide an indication of the depth of the ditching leg. The ditching depth meter 132 comprises a ditching depth gauge 134 that provides markings indicating a depth. A ditching depth indicator 136 is moveable and points to a respective position on the ditching depth gauge 134. The ditching depth indicator 136 is connected to a ditching depth indicator actuator 138 that is also connected to the ditching leg 118 so that when it is raised or lowered, the actuator 138 moves the indicator up or down on the depth gauge 134.

In addition to the meters, the adjustable earth shaping apparatus 100 may further include various mounting locations for securing GPS or other position sensors. For Example, sensors may be located on the wing gussets of each adjustable side section in order to determine the location of the side sections. A sensor may be located on the center section, for example behind the blade angle meter in order to determine the position of the center blade. A sensor may also be mounted to the tow hitch 102. The sensor may be mounted to a mounting plate 116 on a mounting arm 114 that extends away from the hitch in order to locate the sensor above other objects to possibly improve reception of the sensor. The arm may be pivotally mounted to the tow hitch in order to allow the height of the mounting plate 116 to be raised and lowered. The height of the mounting plate may be arranged so that the GPS sensor is associated with the contacting edge of the blade. However, if the ditching leg is in use, it may be desirable to have the GPS sensor associated with the contacting edge of the ditching leg which will be below the blades contacting edge. In order to account for the lower contacting edge, a timing rod 117 may connect the ditching leg 118 to the pivotable GPS mounting arm 114 so that as the ditching leg is lowered the mounting plate is pulled down, thereby providing a mechanical correction to the GPS sensor to reflect the lowest contacting edge of the ditching leg.

Figure 2:
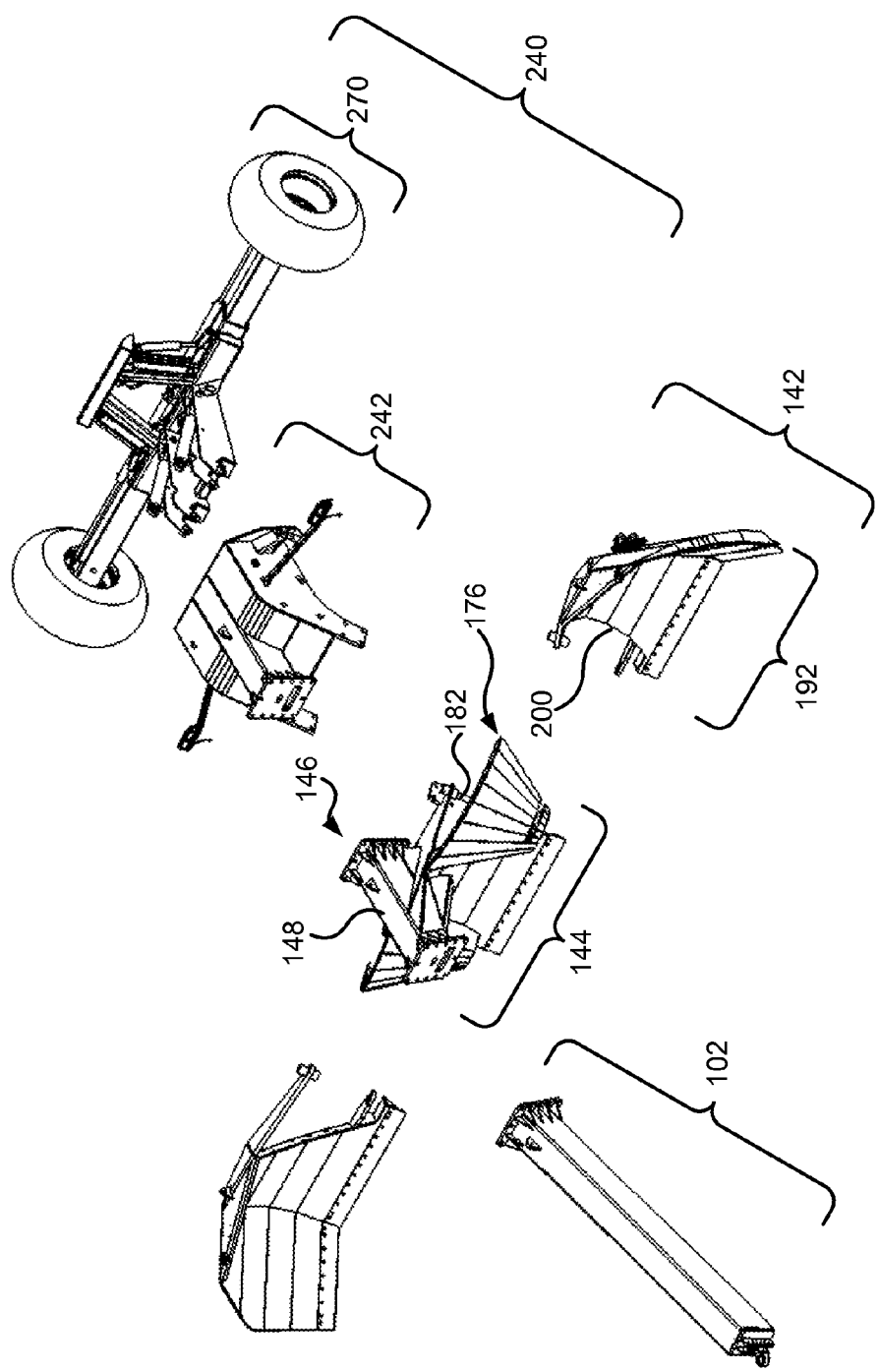
FIG. 2 depicts an exploded view of the adjustable earth shaping apparatus of FIG. 1.
Figure 3:
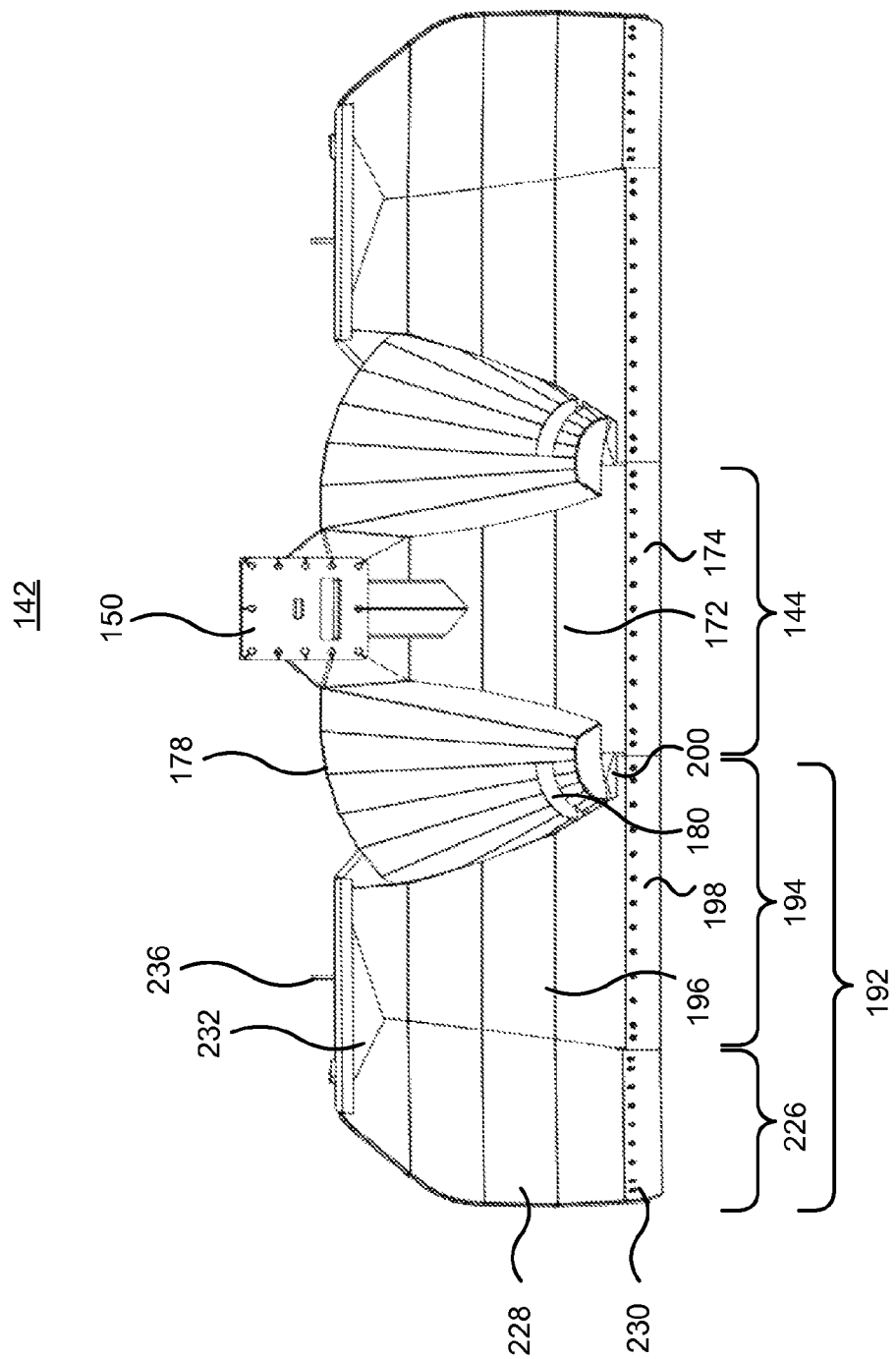
FIG. 3 depicts a front view of an earth shaping blade.

As depicted in FIG. 2, the adjustable earth shaping apparatus 100 may be disassembled into a number of components that can be transported individually for example by rail, transport truck or shipping containers. The assembly of the adjustable earth shaping apparatus begins by attaching the tow hitch 102 and the center section 144 of the adjustable earth shaping blade 142 together by bolting the two mounting flange plates 106, 150. The right and left adjustable side sections 192 may be attached to the center section 144 by lining up the pivotal connections 202 on the center section with the connections on the right and left side sections 192. To attach the adjustable earth shaping blade 142 may be connected to the rear support section by the mounting flange plates 152, 258 and the side mounting plates 154, 250 and insert bolts and tighten.

The rear support section 240 may be assembled by inserting the protruding pivot tube 286 on the outer telescopic tube into the pivot bushing 298 in the cross member 276 of the wheel support section 270, then by installing the pivot cap onto the protruding tube and assigning 4 bolts into relating holes. The left and right inner telescoping tubes 288, 290 can be placed within the back assembly tube by attaching the telescoping hydraulic cylinders to the aligning connection point tabs 294 and the axles and then installing connecting pins. The tire axle assembly can be installed into the end of the inner telescoping tube where a bolt is placed into a bushing of the telescoping tube and into the end of the axle shaft. The rear support frame 242 and wheel support section 270 may be connected together by aligning the pivot connection points and the pivotal arms of the wheel support section. Bolts are used to secure the pivotal connection. Hydraulic cylinders are connected to the height adjustment cylinder connection points 264, 278.

Figure 34:
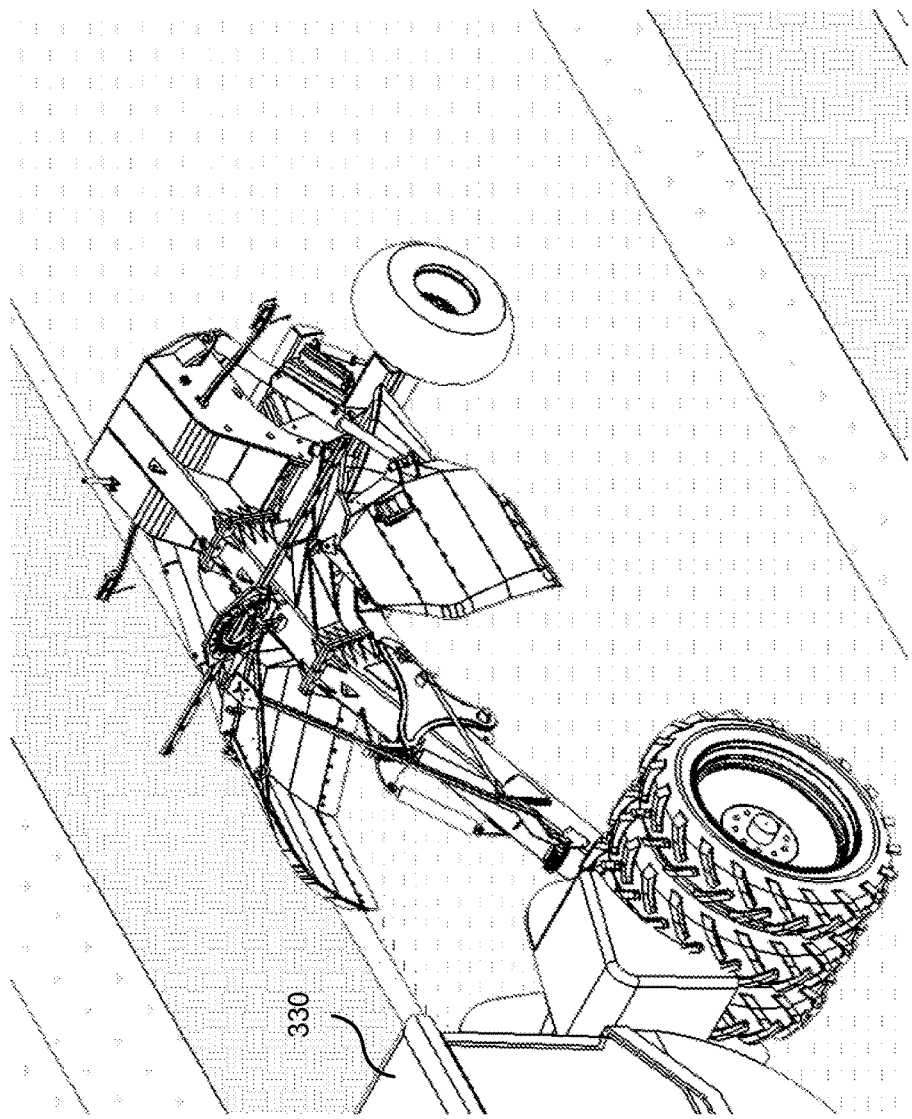
FIG. 34 depicts the use of the earth shaping apparatus in the transport position.

The adjustable earth shaping blade can be adjusted to provide different profiles for shaping earth as depicted in FIGS. 14, 18, 22, 26 and 30, which depict the earth shaping apparatus being towed in a ditching direction by a tow vehicle 330. The adjustable earth shaping apparatus may also be placed in a transport position as depicted in FIG. 34.

Figure 14:
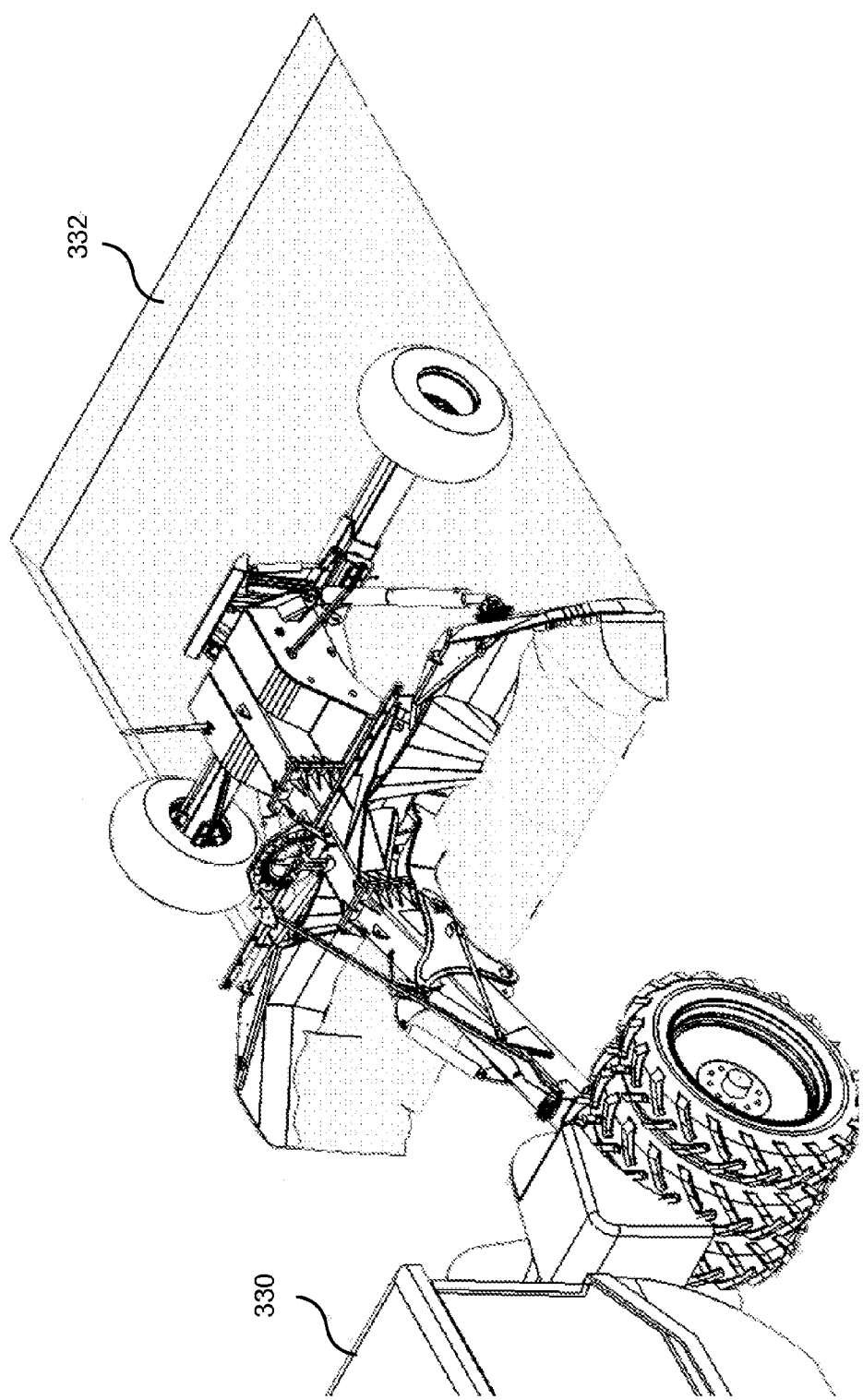
FIG. 14 depicts the use of the earth shaping apparatus in a first position.

FIG. 9 depicts an isometric view of the earth shaping apparatus with additional components in a first position. FIG. 10 depicts a front view of the earth shaping apparatus in the first position. FIG. 11 depicts a side view cross section of the earth shaping apparatus in the first position. FIG. 14 depicts the use of the earth shaping apparatus in the first position. In the first position the contacting edges of the adjustable side sections and center sections are collinear with each other and the earth shaping blade provides a flat contacting profile 332 that can be used to level earth. The depth of cut may be adjusted by pivoting the wheel support under, or out from under, the rear support frame, thereby raising or lowering the blade.

Figure 15:
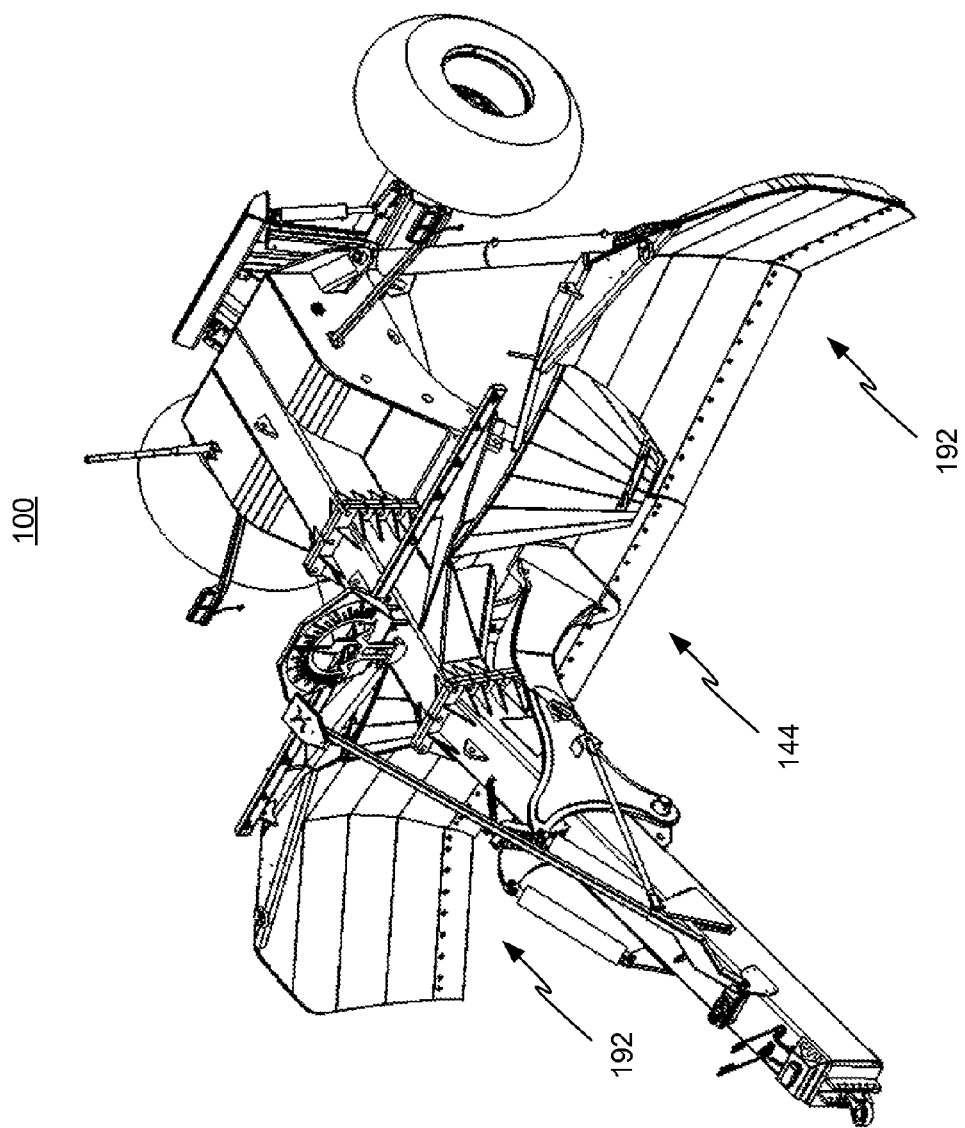
FIG. 15 depicts an isometric view of the earth shaping apparatus in a second position.
Figure 16:
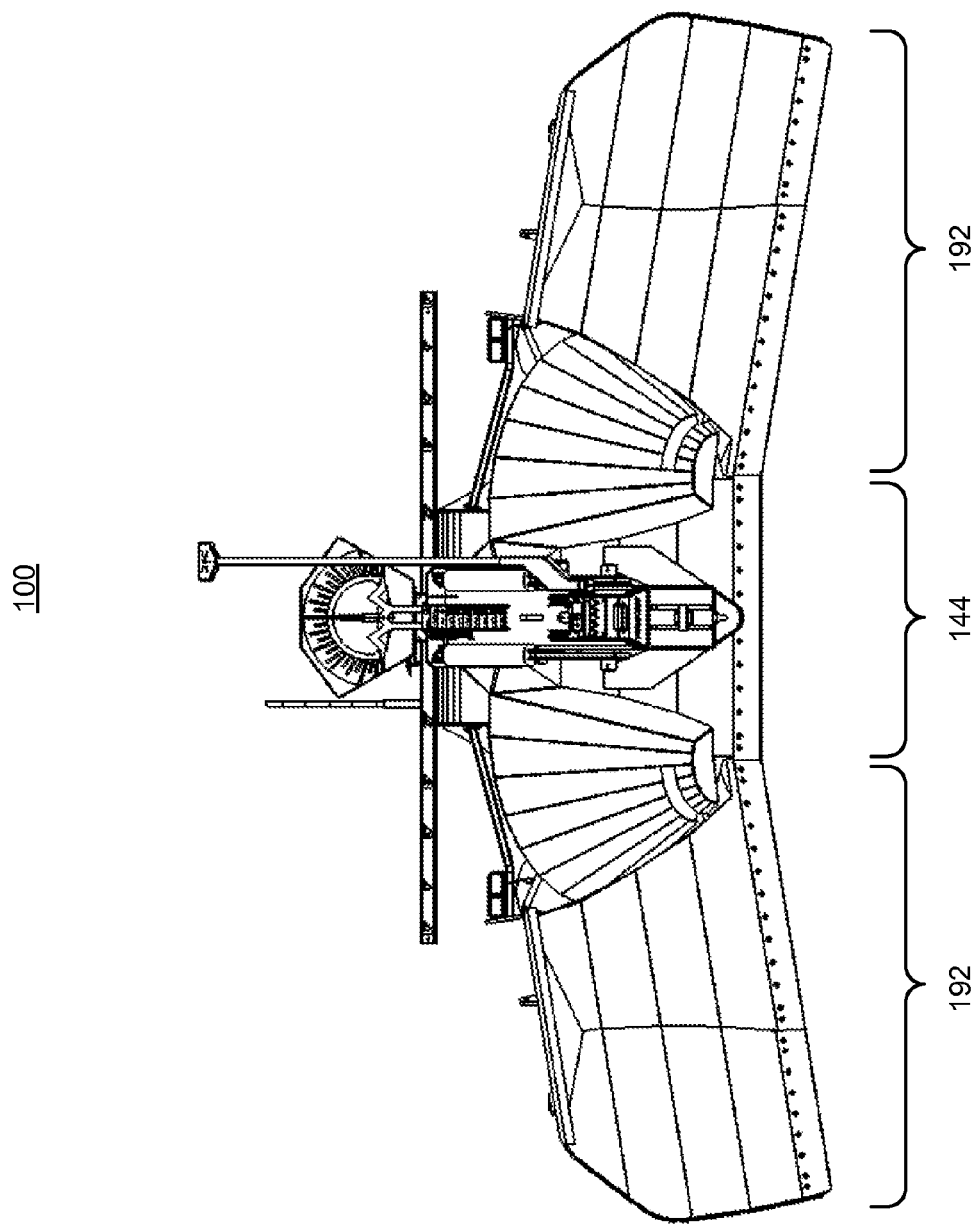
FIG. 16 depicts a front view of the earth shaping apparatus in the second position.
Figure 17:
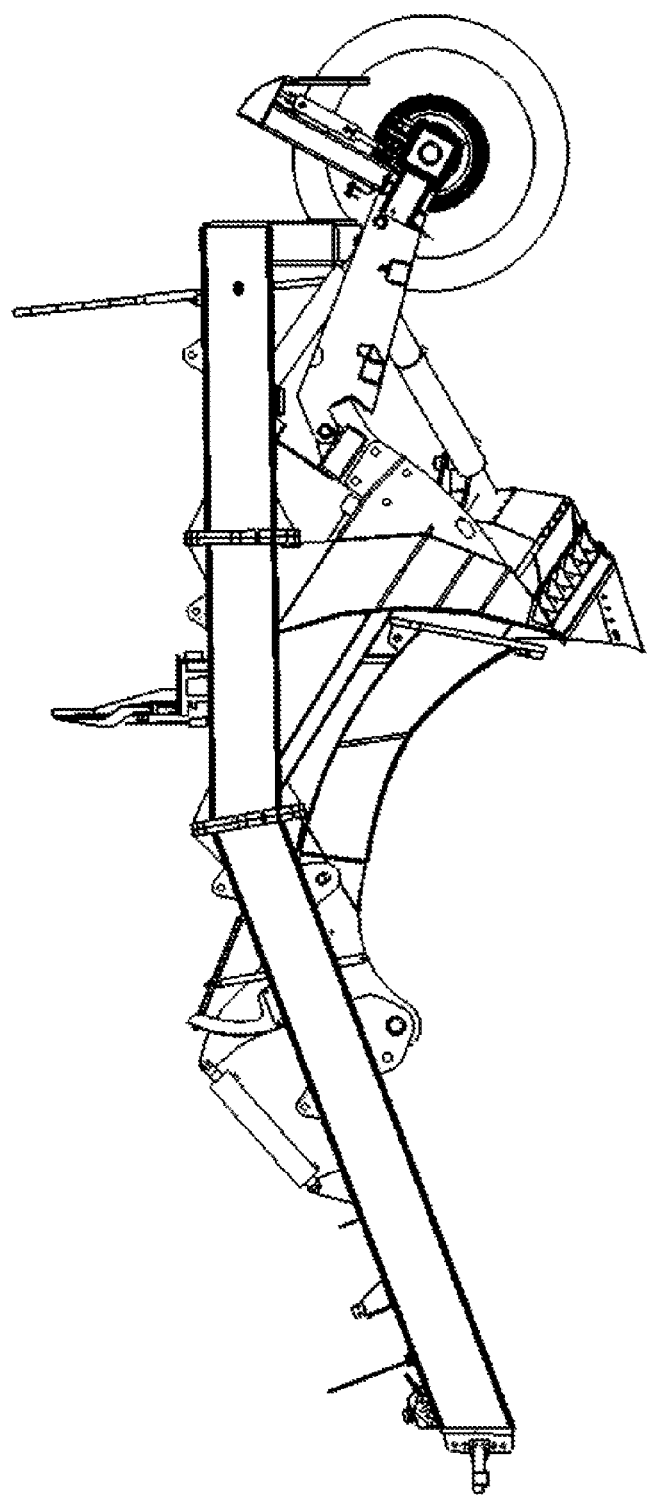
FIG. 17 depicts a side view cross section view of the earth shaping apparatus in the second position.
Figure 18:
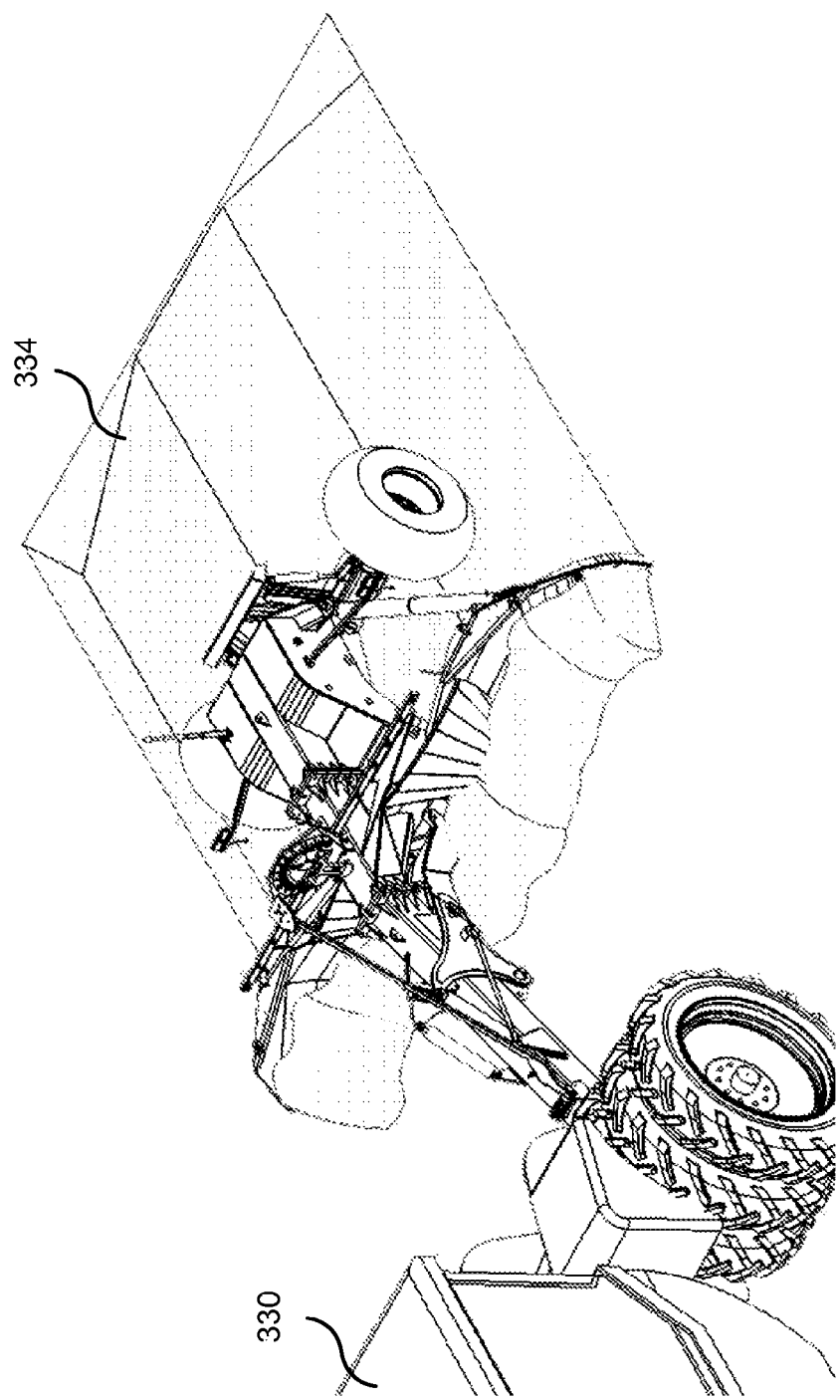
FIG. 18 depicts the use of the earth shaping apparatus in the second position.

FIG. 15 depicts an isometric view of the earth shaping apparatus in a second position. FIG. 16 depicts a front view of the earth shaping apparatus in the second position. FIG. 17 depicts a side view cross section view of the earth shaping apparatus in the second position. FIG. 18 depicts the use of the earth shaping apparatus in the second position. In the second position, the right and left side sections are winged backwards about the tilted pivot axis. The tilted pivot axis causes the side sections to tilt downwards, providing a contacting edge profile 334 having a trapezoidal shape that can be used, for example to crown a road.

Figure 19:
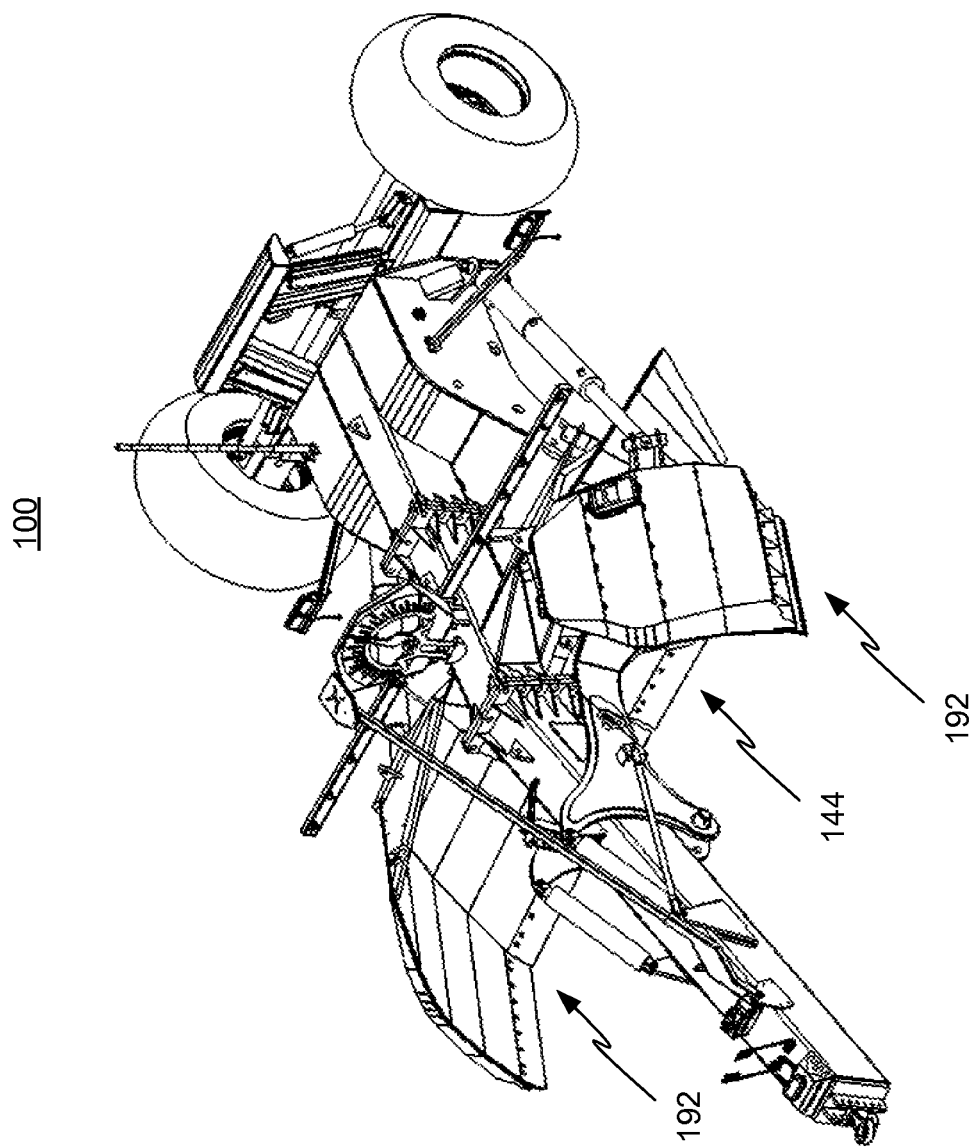
FIG. 19 depicts an isometric view of the earth shaping apparatus in a third position.
Figure 20:
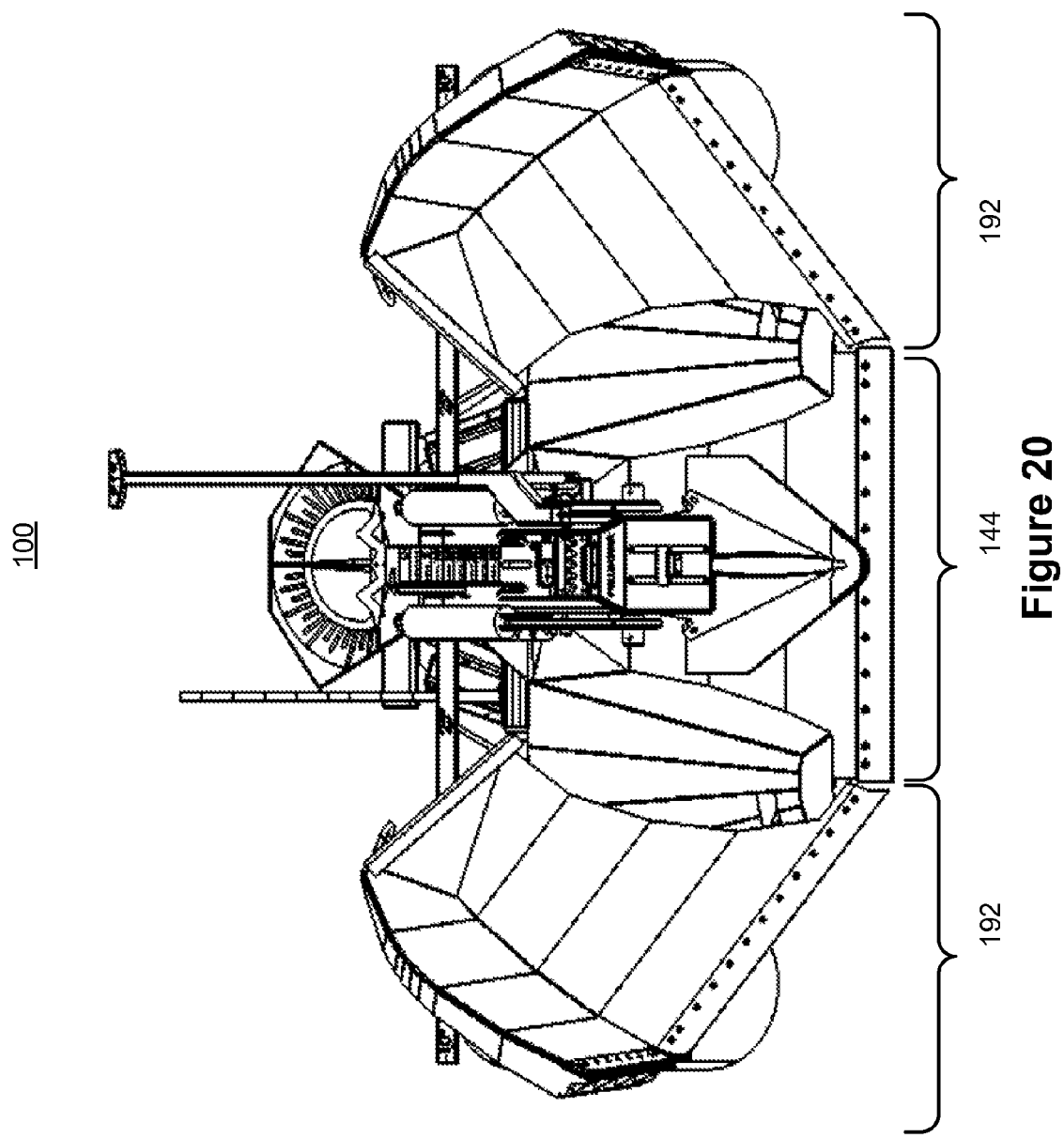
FIG. 20 depicts a front view of the earth shaping apparatus in the third position.
Figure 21:
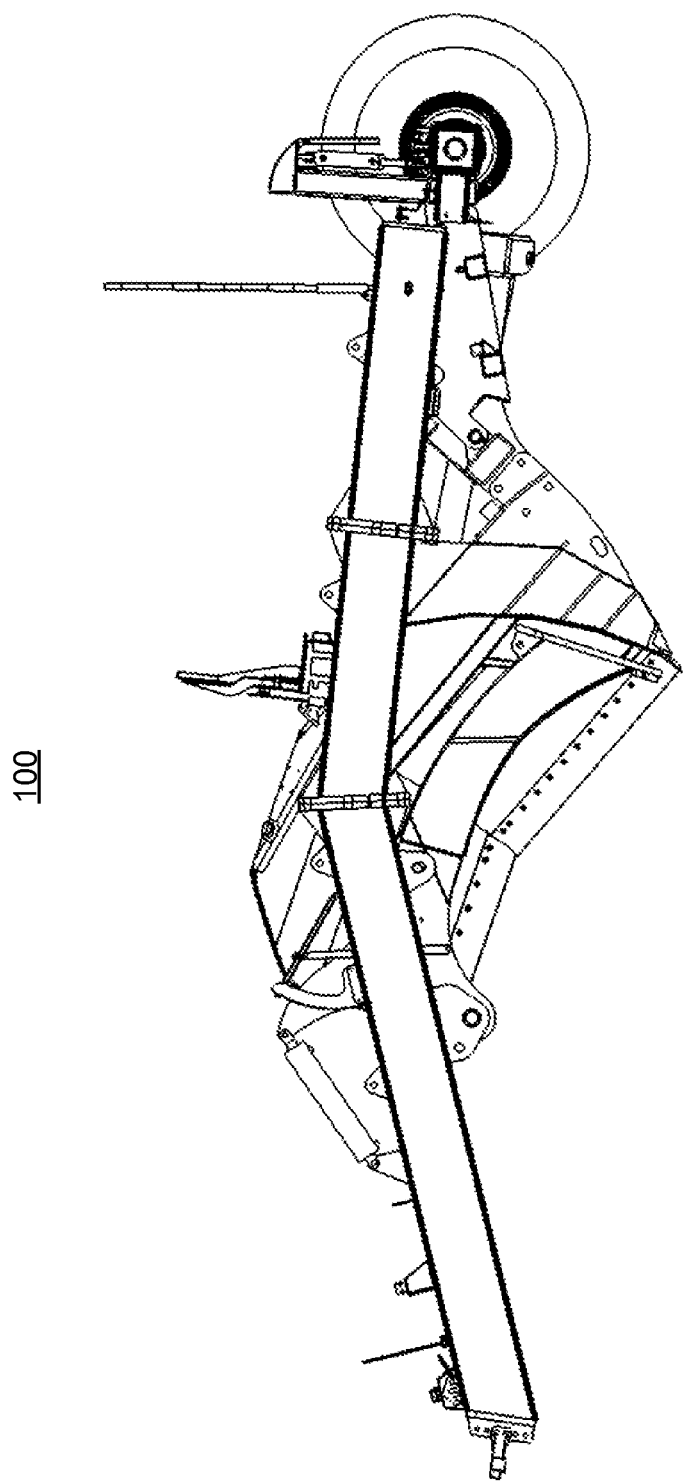
FIG. 21 depicts a side view cross section view of the earth shaping apparatus in the third position.
Figure 22:
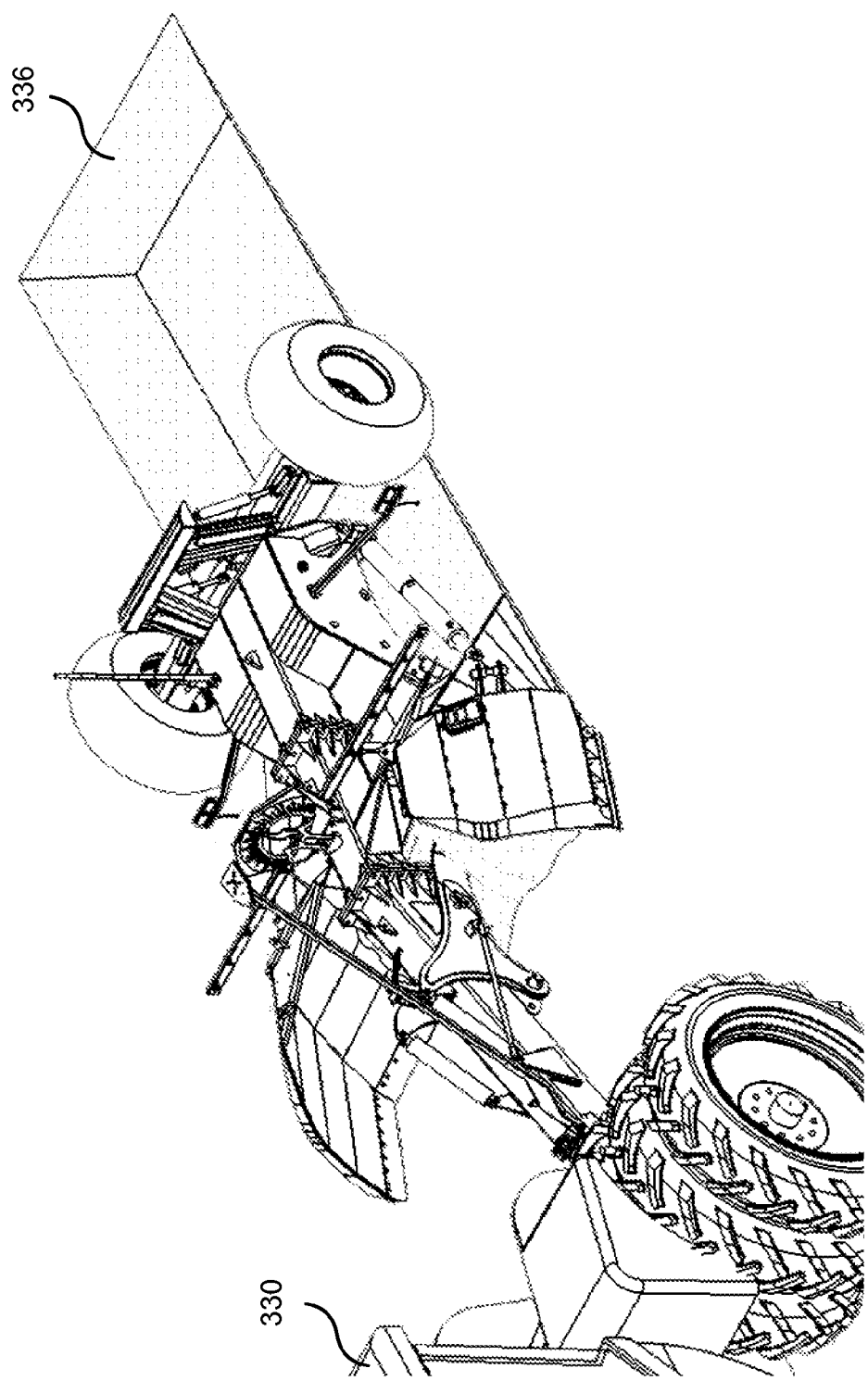
FIG. 22 depicts the use of the earth shaping apparatus in the third position.

FIG. 19 depicts an isometric view of the earth shaping apparatus in a third position. FIG. 20 depicts a front view of the earth shaping apparatus in the third position. FIG. 21 depicts a side view cross section view of the earth shaping apparatus in the third position. FIG. 22 depicts the use of the earth shaping apparatus in the third position. In the third position, the left and right side sections are winged forward to provide a trapezoidal contacting edge profile 336, that is inverted compared to the trapezoidal profile 334 of the second position. The third position may be used, for example, to create a large ditch in one pass.

Figure 23:
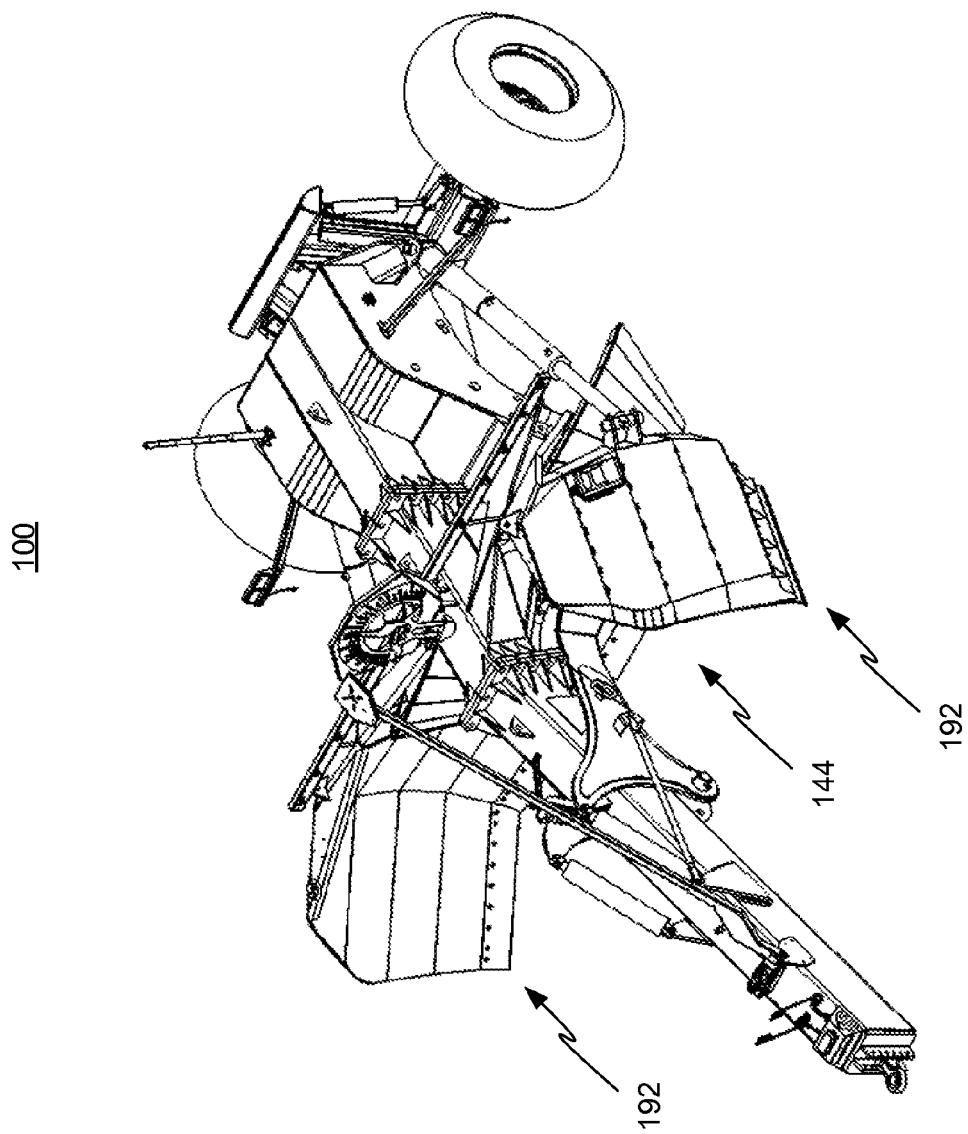
FIG. 23 depicts an isometric view of the earth shaping apparatus in a fourth position.
Figure 24:
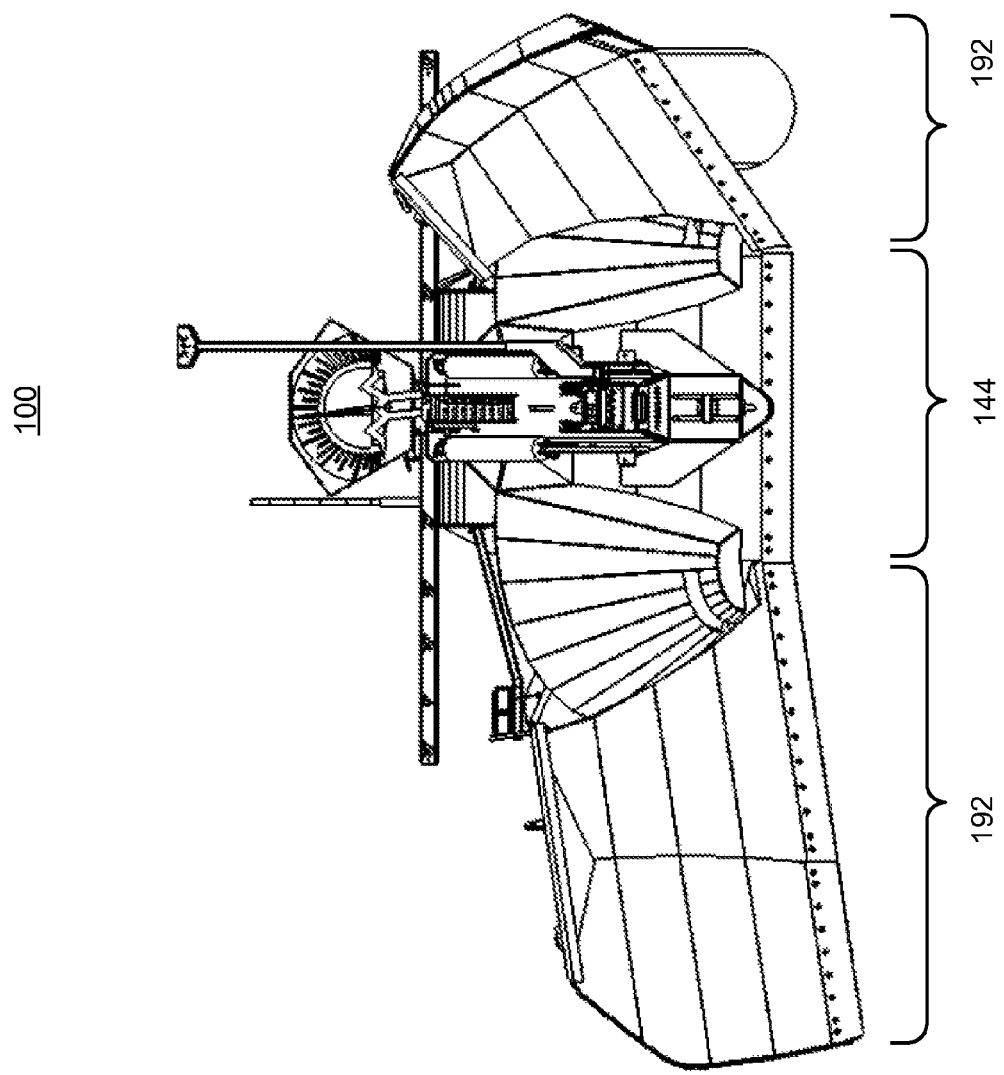
FIG. 24 depicts a front view of the earth shaping apparatus in the fourth position.
Figure 25:
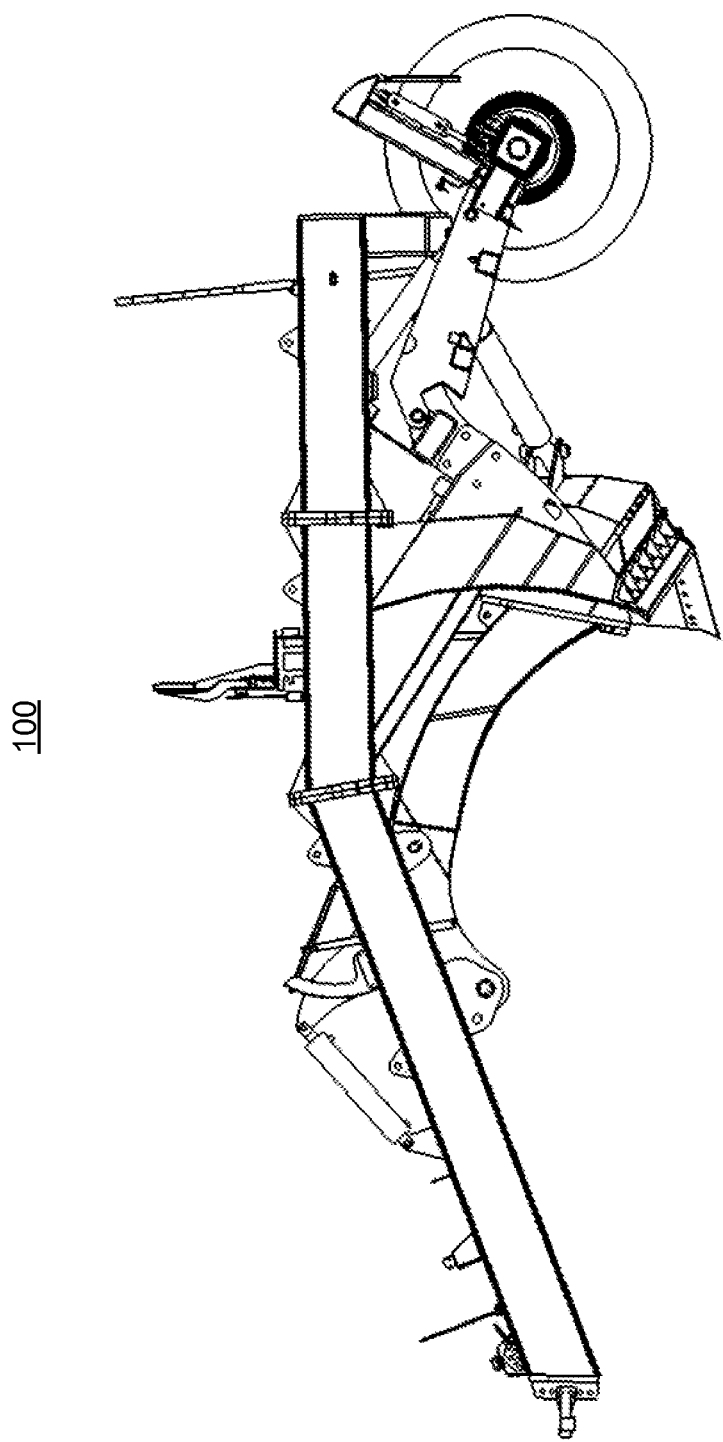
FIG. 25 depicts a side view cross section view of the earth shaping apparatus in the fourth position.
Figure 26:
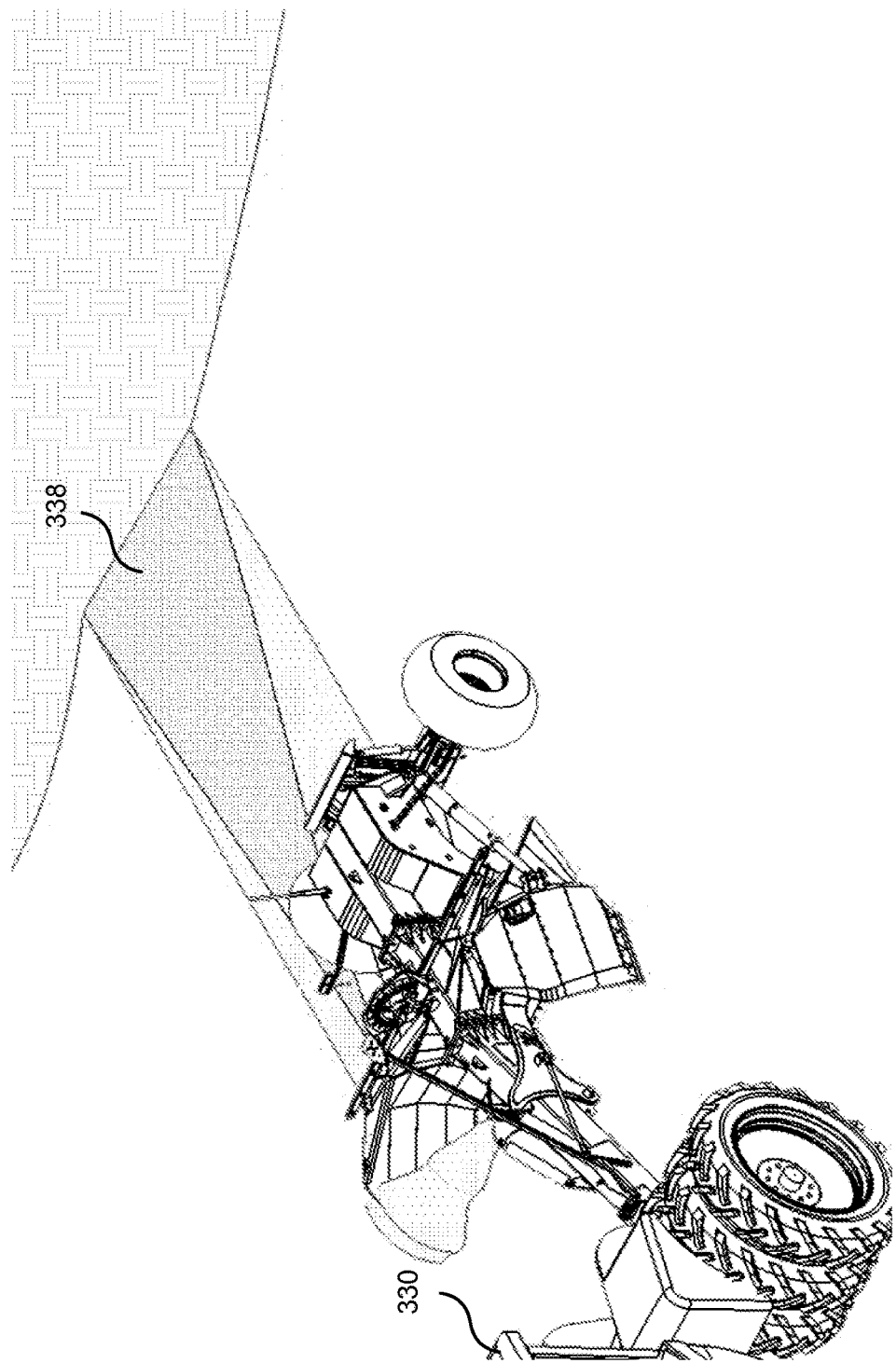
FIG. 26 depicts the use of the earth shaping apparatus in the fourth position.

FIG. 23 depicts an isometric view of the earth shaping apparatus in a fourth position. FIG. 24 depicts a front view of the earth shaping apparatus in the fourth position. FIG. 25 depicts a side view cross section view of the earth shaping apparatus in the fourth position. FIG. 26 depicts the use of the earth shaping apparatus in the fourth position. In the fourth position, the left side section is winged forwards, and the right side section is winged backwards to provide a stepped contacting edge profile 338. If the side section positions are reversed, so that the left side section is winged backward and the right side section is winged forwards, it is possible to form a stepped ditch in two passes, where using traditional earth shaping apparatuses would require additional passes.

Figure 27:
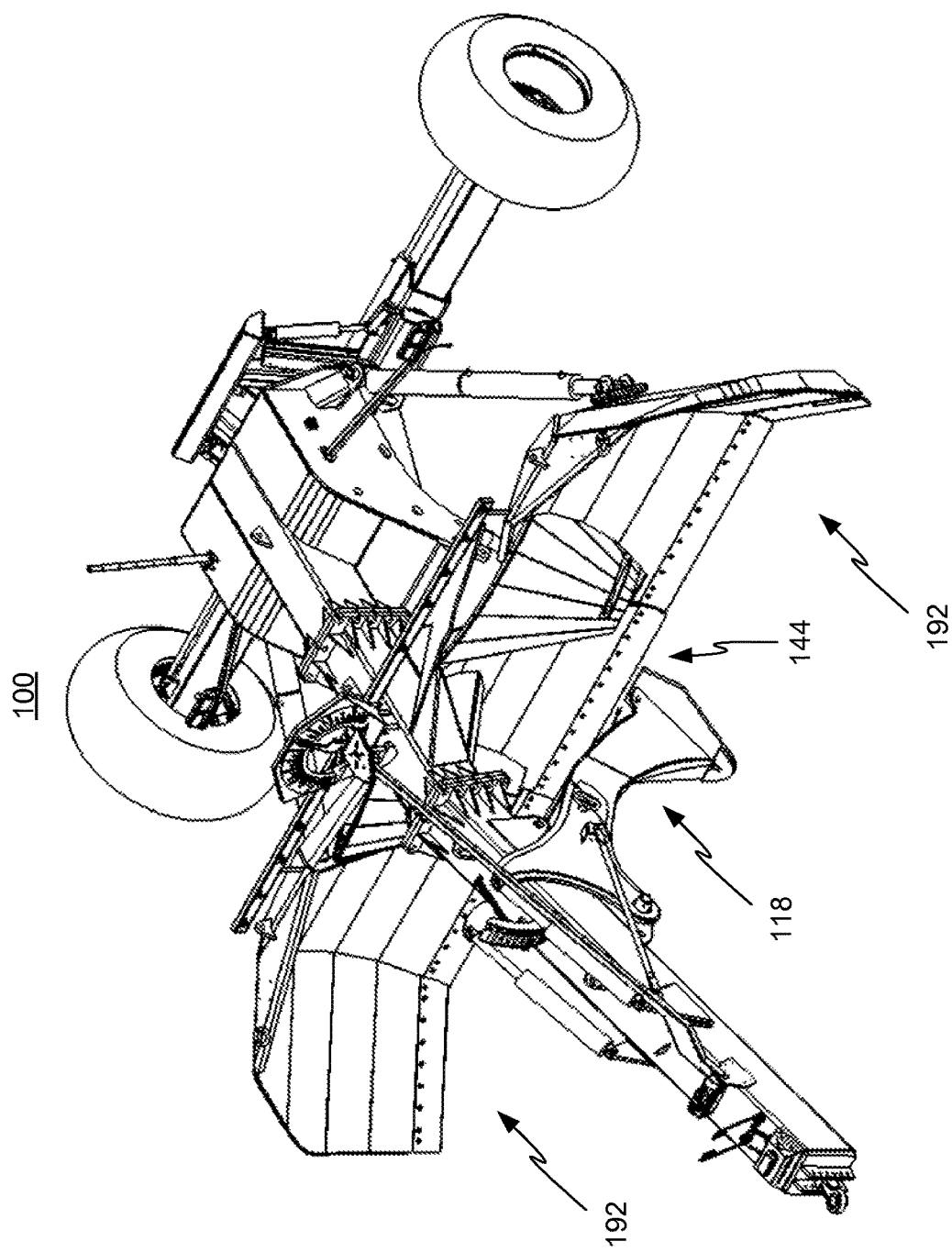
FIG. 27 depicts an isometric view of the earth shaping apparatus in a fifth position.
Figure 28:
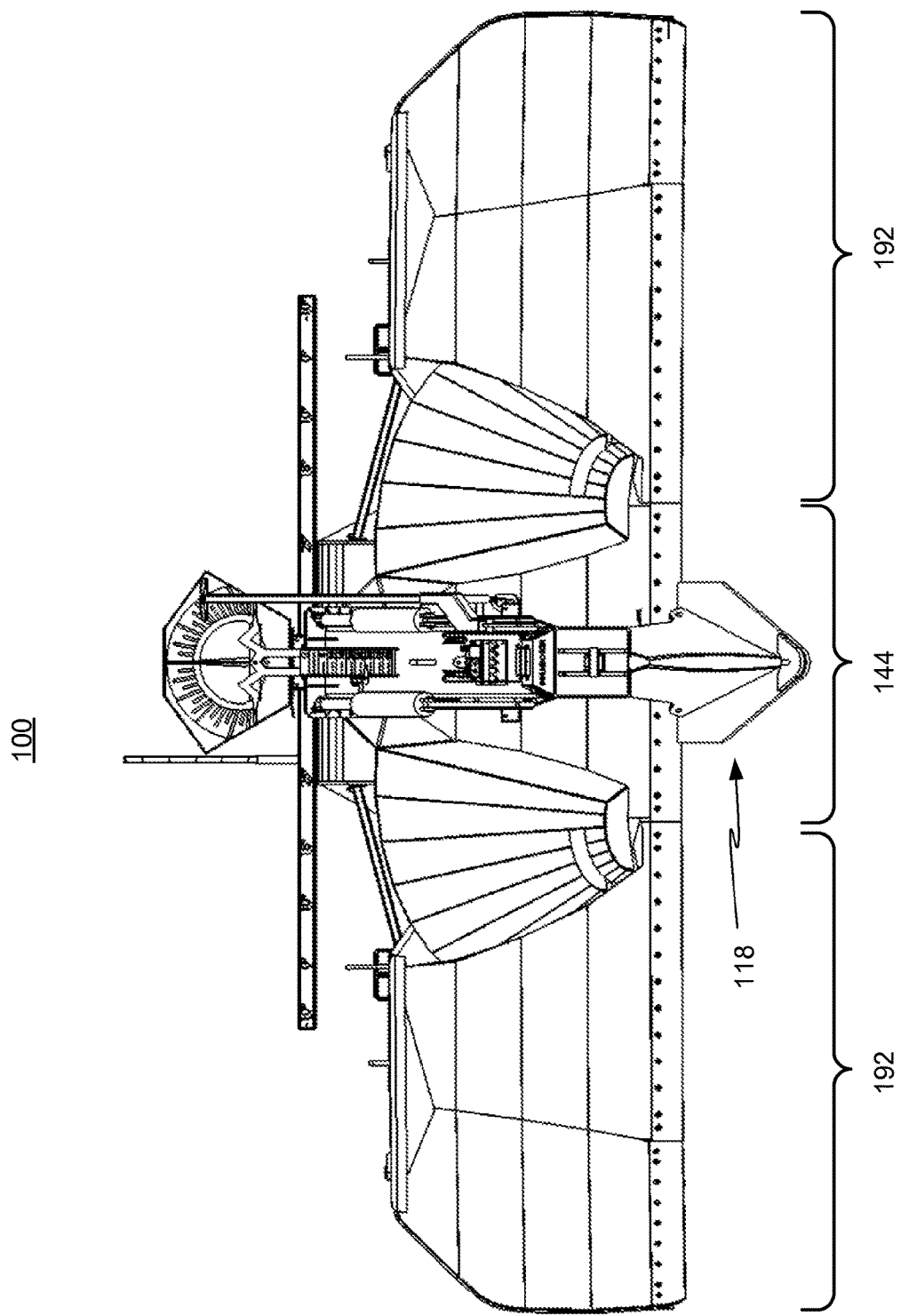
FIG. 28 depicts a front view of the earth shaping apparatus in the fifth position.
Figure 29:
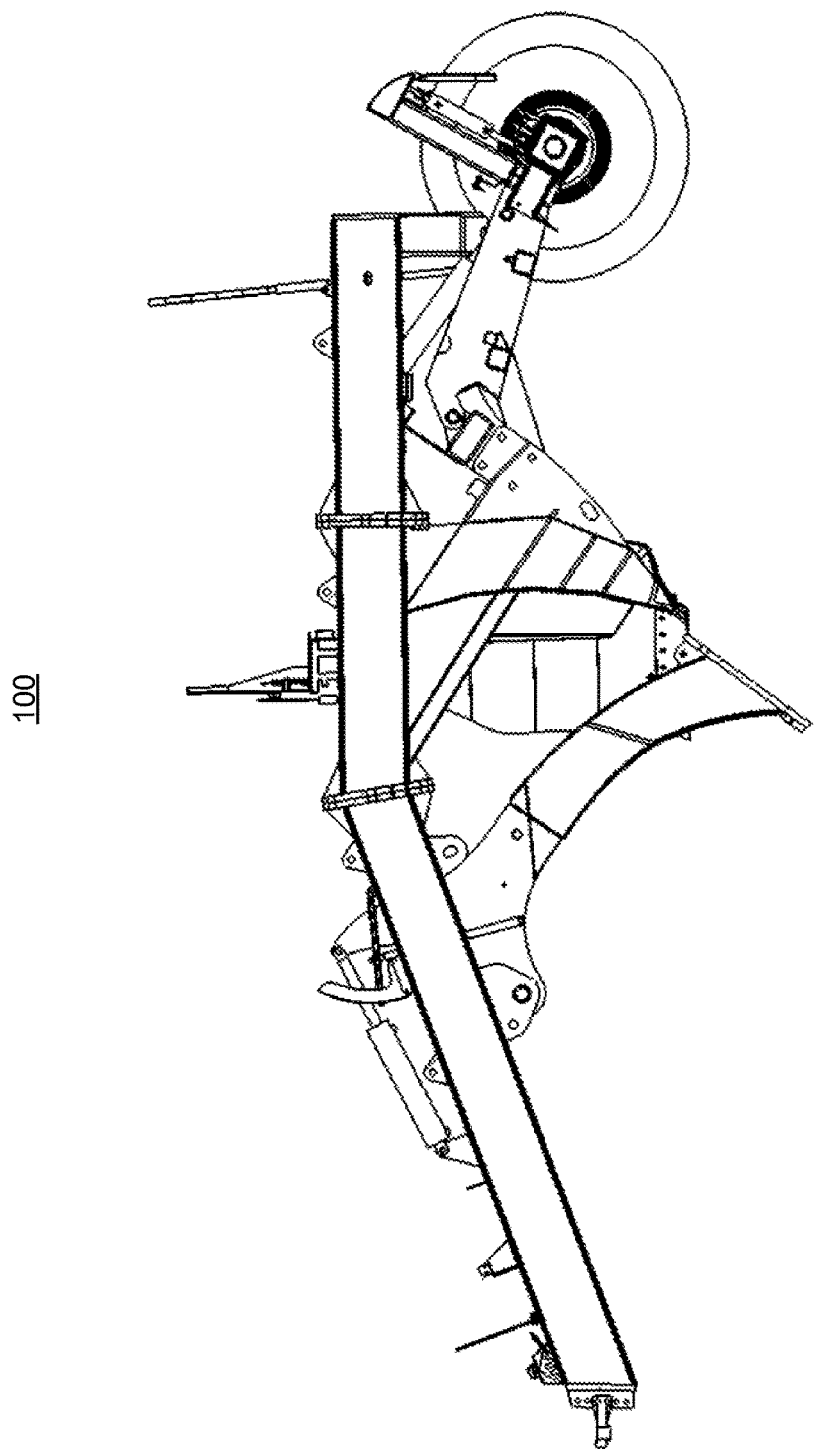
FIG. 29 depicts a side view cross section view of the earth shaping apparatus in the fifth position.
Figure 30:
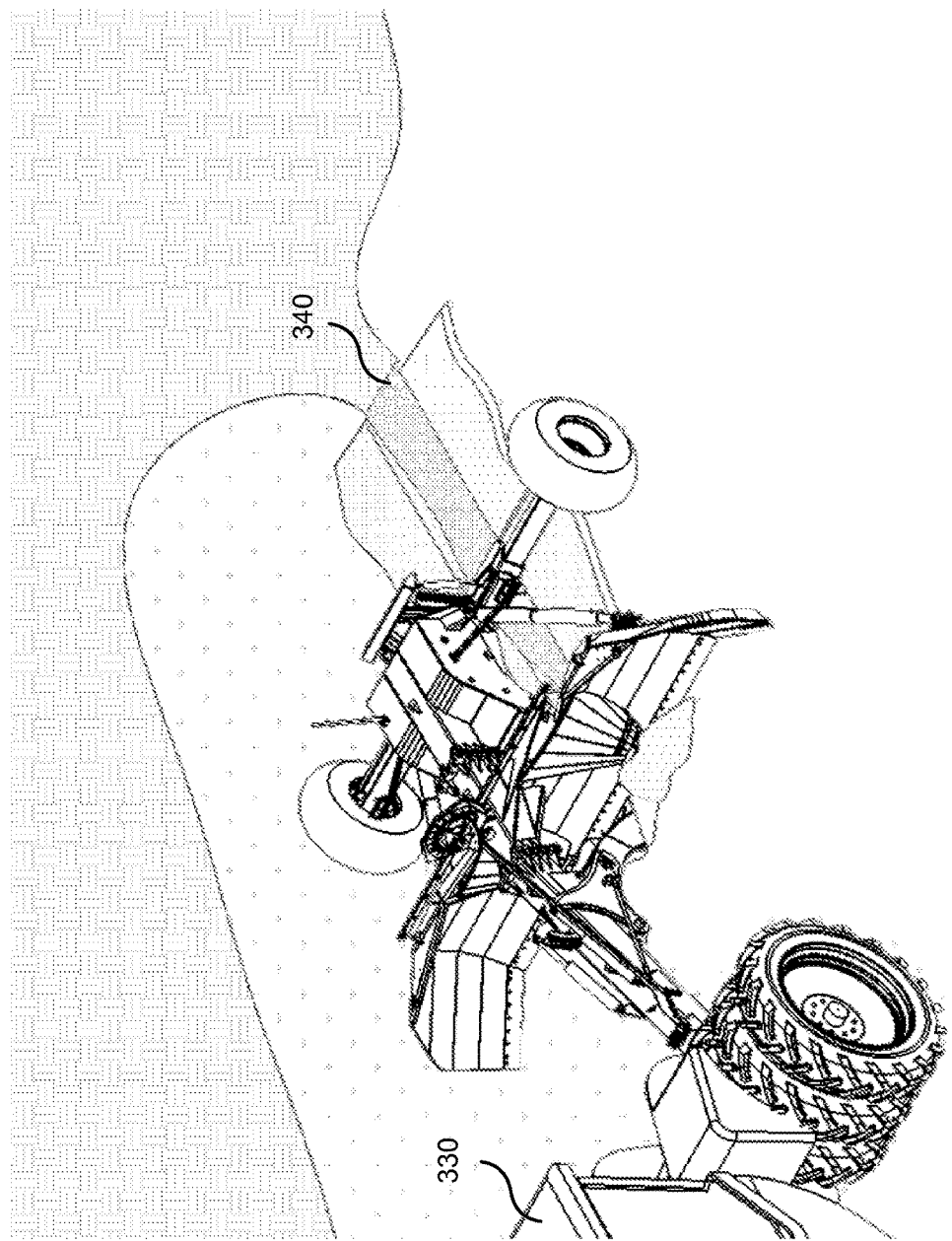
FIG. 30 depicts the use of the earth shaping apparatus in the fifth position.

FIG. 27 depicts an isometric view of the earth shaping apparatus in a fifth position. FIG. 28 depicts a front view of the earth shaping apparatus in the fifth position. FIG. 29 depicts a side view cross section view of the earth shaping apparatus in the fifth position. FIG. 30 depicts the use of the earth shaping apparatus in the fifth position. The fifth position has the blade in a collinear arrangement similar to the first position, however the ditching leg is lowered into a ditching position, the can provide a leveled ditch 340.

The track width of the wheels may be adjusted from a fully extended position, as depicted in, for example, FIGS. 27 to 30, to a fully retracted position as depicted in, for example FIGS. 23 to 26. The fully extended position may provide additional stability, while the fully retracted position may make maneuvering the earth shaping apparatus simpler. In order to adjust the track width, the wheels should be lifted off the ground before extending or retracting the telescopic axle tubes. The wheels may be hoisted off the ground, for example using one or more of the lifting points, or the blade may be lowered completely to the ground. Once on the ground, the wheels can be pivoted further outwards and off the ground. With the wheels off the ground, the track width can be adjusted.

Figure 31:
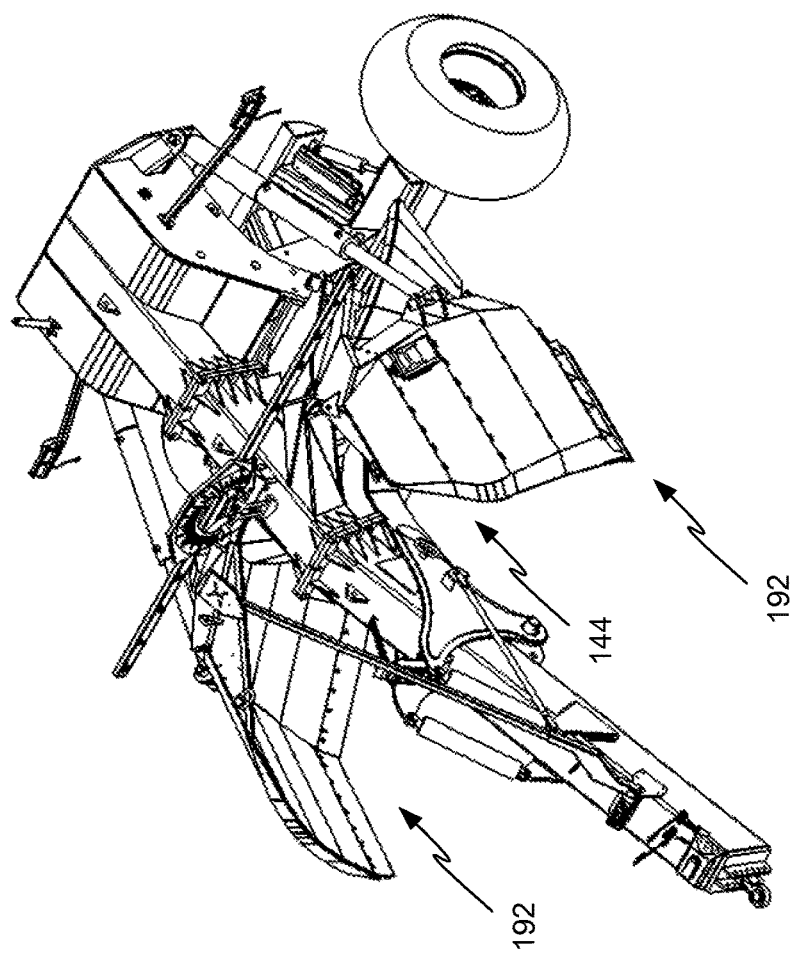
FIG. 31 depicts an isometric view of the earth shaping apparatus in a transport position.
Figure 32:
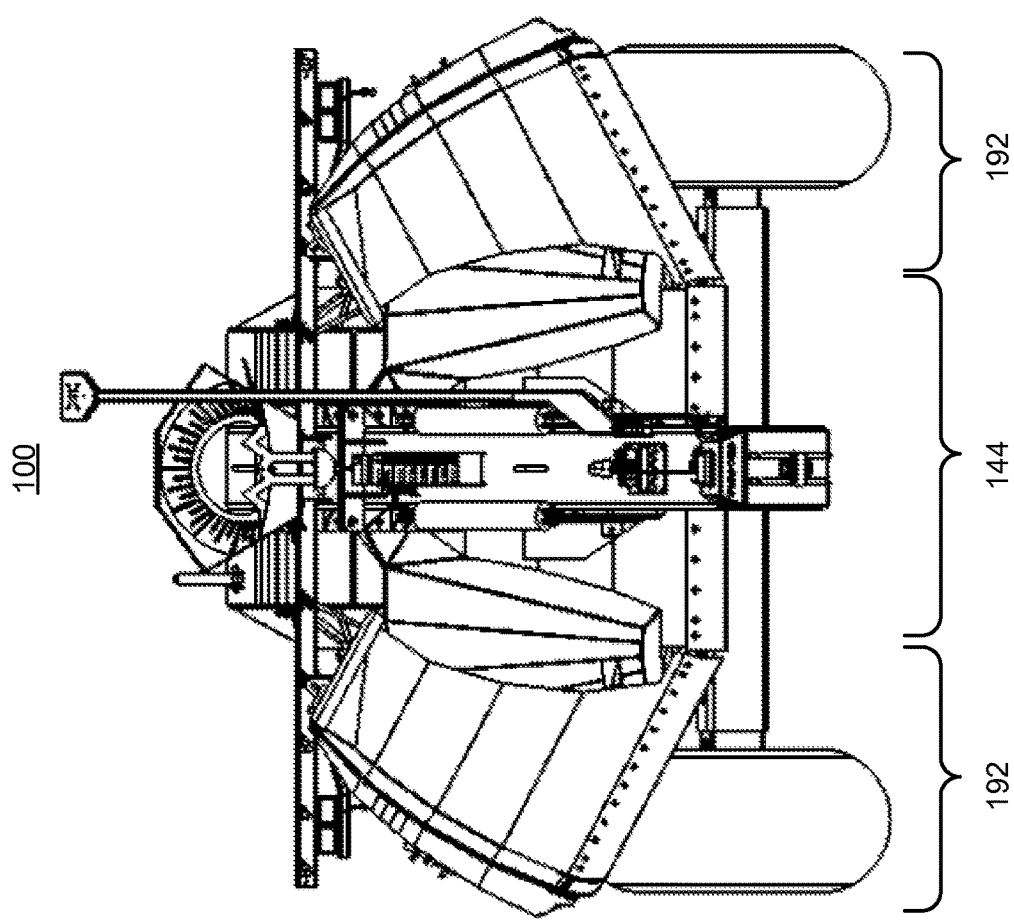
FIG. 32 depicts a front view of the earth shaping apparatus in the transport position.
Figure 33:
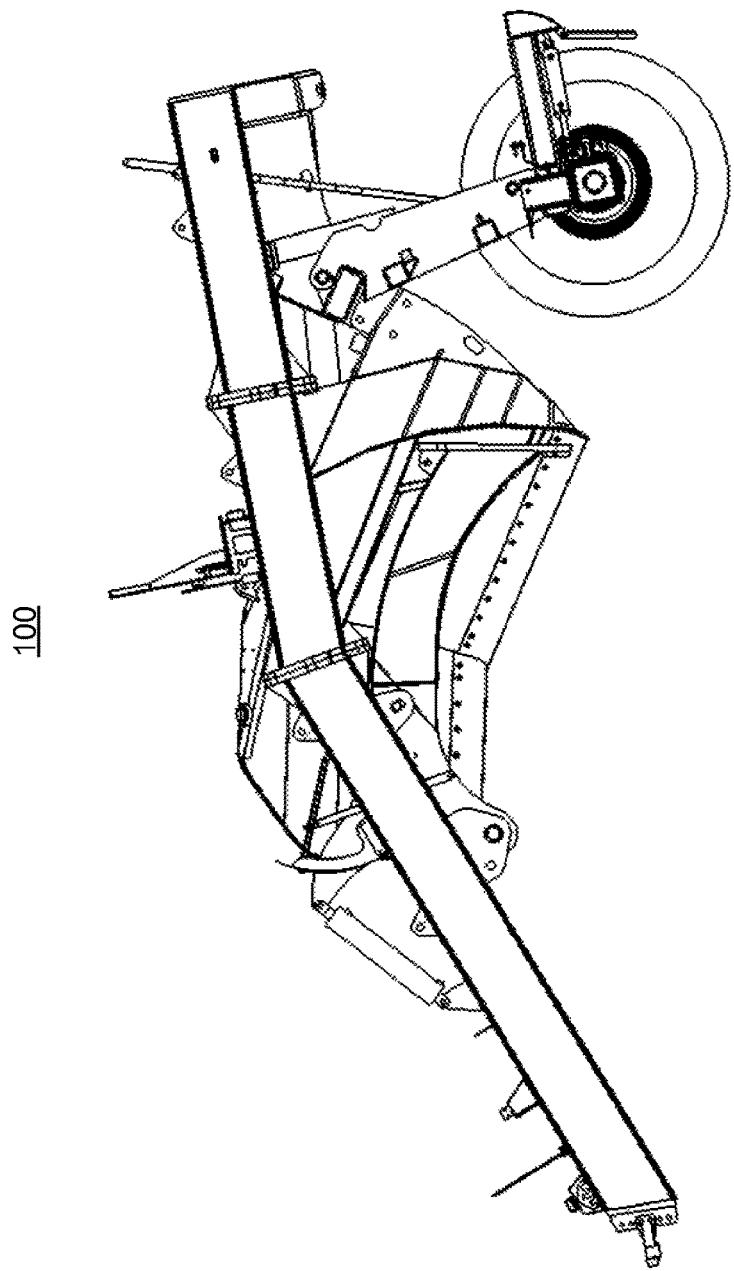
FIG. 33 depicts a side view cross section view of the earth shaping apparatus in the transport position.

FIG. 31 depicts an isometric view of the earth shaping apparatus in a transport position. FIG. 32 depicts a front view of the earth shaping apparatus in the transport position. FIG. 33 depicts a side view cross section view of the earth shaping apparatus in the transport position. FIG. 34 depicts the use of the earth shaping apparatus in the transport position. In the transport position, the wheels are fully retracted, and the blade raised to its full height by pivoting the wheel support section fully under the support frame. The side sections can be winged completely forward in order to provide the smallest possible dimensions for the earth shaping for transport on roadways.

The above has describe various possible positions of the earth shaping apparatus and potential uses for the different positions. The earth shaping apparatus provides flexibility to the user and other positions not described can be used. The flexibility of the apparatus may allow the user to shape land in less time by requiring fewer passes. Additionally, or alternatively, the flexibility of the apparatus may result in fewer machines being required to complete a project.

The above has described an earth shaping apparatus comprising an adjustable earth shaping blade that is mounted on a support structure and towed behind a tow vehicle. An adjustable earth shaping blade earth shaping blade, having a center section blade and at least one side section blade mounted to the center section at an oblique angle, may be mounted directly to, or form part of the tow vehicle itself.

Although specific embodiments have been described above, it will be appreciated that the specific design may be altered while still providing an adjustable earth shaping apparatus that has at least one adjustable side section arranged on a tilted axis. Further, although the above has referred to shaping earth, the same apparatus may be used in grading, shaping or moving other materials such as snow, ice, gravel, etc. The specific embodiments described above are intended to be illustrative of the various features and components of the earth shaping blade and apparatus.

What is claimed is:

1. An adjustable earth shaping blade comprising:
   a center section comprising a center blade having a contacting edge for contacting the earth; and
   at least one adjustable side section pivotally connected to the center section, each of the at least one adjustable side sections having a respective side blade having a contacting edge for contacting the earth, a pivotal axis of the pivotal connection defining a line that intersects, at an oblique angle, a plane that is perpendicular to a tow direction of the adjustable earth shaping blade, the pivot axis extending in a direction away from the tow direction and the earth, the plane containing therein at least two points vertically offset from each other on a front face of the center blade,
   wherein the pivotal axis of the at least one adjustable side section is arranged at an angle of between 15° and 75° relative to a horizontal plane of the earth in which the contacting edge of the center section lies.

2. The adjustable earth shaping blade of claim 1, comprising two adjustable side sections each pivotally connected to opposite sides of the center section.

3. The adjustable earth shaping blade of claim 2, wherein the respective pivotal axis of each of the two side sections are arranged at the same angle relative to the contacting edge of the center section.

4. The adjustable earth shaping blade of claim 1, wherein the angle of the pivotal axis is between 30° and 60°.

5. The adjustable earth shaping blade of claim 4, wherein the angle of the pivotal axis is 45°.

6. The adjustable earth shaping blade of claim 1, wherein the center section further comprises a protective section having a frusto-conical shape covering the pivotal axis of each of the at last one adjustable side section, each of the at least one adjustable side section comprises a cut-out portion allowing the respective side section to rotate about the protective section.

7. The adjustable earth shaping blade of claim 1, wherein each of the at least one adjustable side sections further comprise a wing extension extending from an end of the respective side section opposite the pivotal connection to the center section, the wing extension comprising a wing blade connected to the side blade and extending outward at a forward angle from the side blade.

8. The adjustable earth shaping blade of claim 1, wherein each of the at least one adjustable side sections comprise a connection point for coupling a hydraulic cylinder to the respective adjustable side section.

9. The adjustable earth shaping apparatus of claim 1, wherein each of the at least one adjustable side section may be pivoted about the respective pivotal axis to an up-turned position in which the contacting edge of the respective side blade extends forward and upward from the contacting edge of the center blade.

10. The adjustable earth shaping apparatus of claim 1, wherein each of the at least one adjustable side section may be pivoted about the respective pivotal axis to a horizontal position in which the contacting edge of the respective side blade extends horizontally from the contacting edge of the center blade.

11. The adjustable earth shaping apparatus of claim 1, wherein each of the at least one adjustable side section may be pivoted about the respective pivotal axis to an down-turned position in which the contacting edge of the respective side blade extends backward and downward from the contacting edge of the center blade.

12. The adjustable earth shaping blade of claim 1, further comprising a frame connection for connecting the adjustable earth shaping blade to a support frame.

13. The adjustable earth shaping blade of claim 1, further comprising a tow-point connection for connecting the adjustable earth shaping blade to a vehicle.

14. The adjustable earth shaping apparatus of claim 1, wherein the at least one adjustable side section and center section, are moveable over the earth in a first position in which the respective lower contacting edge of the at least one adjustable side section extends from the lower contacting edge of the center section towards the earth.

15. The adjustable earth shaping apparatus of claim 14, wherein the at least one adjustable side section and center section, are moveable over the earth in a second position in which the respective lower contacting edge of the at least one adjustable side section extends from the lower contacting edge of the center section parallel to the earth.

16. The adjustable earth shaping apparatus of claim 15, wherein the at least one adjustable side section and center section, are moveable over the earth in a third position in which the respective lower contacting edge of the at least one adjustable side section extends from the lower contacting edge of the center section away from the earth.

17. The adjustable earth shaping blade of claim 1, further comprising a ditching surface moveable between a retracted position in which, the ditching surface does not contact the earth and an extended position in which, the ditching surface is extendable below the lower contacting edge of the center section and contacts the earth to provide a ditch.

18. An earth shaping apparatus comprising:
   a support frame comprising a plurality of wheels; and
   an adjustable earth shaping blade according to claim 1 connected to the support frame.

19. The earth shaping apparatus of claim 18, further comprising:
   at least one blade-adjustment hydraulic cylinder coupled between the support frame and the at least one adjustable side section of the adjustable earth shaping blade.

20. The earth shaping apparatus of claim 18, wherein the support frame comprises:
   a main frame for connecting the support frame to the adjustable earth shaping blade;
   a wheel support structure comprising a pivot arm pivotally connected to the main frame at a first end to allow the wheel support structure to pivot up and down; and
   an axle structure pivotally connected to the wheel support structure at a second end opposite the first end, a pivotal axis of the pivotal connection of the wheel support structure perpendicular to a pivotal axis of the pivotal connection of the wheel support to the main frame.

21. The earth shaping apparatus of claim 20, wherein the support frame further comprises at least one height-adjustment hydraulic cylinder connected to the wheel support structure and the main frame.

22. The earth shaping apparatus of claim 20, wherein the support frame further comprises at least one axle-tilt hydraulic cylinder connected to the axle structure and the wheel support structure.

23. The earth shaping apparatus of claim 20, wherein the axle structure comprises the plurality of wheels mounted to telescoping tubes of the axle structure to allow a track width of the earth shaping apparatus to be adjusted.

24. The earth shaping apparatus of claim 20, further comprising a blade-tilt indicator comprising an indicator controlled by a horizontal tilt of the center section.

25. The earth shaping apparatus of claim 18, further comprising a tow hitch section connected to the adjustable earth shaping blade for pulling the earth shaping apparatus behind a tow vehicle.

26. The earth shaping apparatus of claim 25, further comprising:
a ditching leg pivotally connected to the tow hitch section and moveable between:
   a retracted position in which the ditching leg is located above the contacting edge of the center section; and
   a ditching position in which a contacting edge of the ditching leg is located below the contacting edge of the center section.

27. The earth shaping apparatus of claim 18, further comprising a wing position gauge comprising:
a horizontal bar with inclination markings thereon; and
a guide pin extending upwards from the at least adjustable side section, the guide pin indicating a position on the inclination markings as the at least one adjustable side section is pivoted about the pivotal axis.

28. The earth shaping apparatus of claim 18, further comprising a land-level indicator comprising a weighted pendulum indicator providing an indication of positioning relative to horizontal.

29. The earth shaping apparatus of claim 18, further comprising a blade height indicator indicative of a height of the center section.

30. The earth shaping apparatus of claim 18, further comprising one or more Global Positioning System (GPS) mounts for mounting GPS sensors.

31. The earth shaping apparatus of claim 18, wherein the earth shaping apparatus can be disassembled and transported in a plurality of intermodal shipping containers.

32. An earth shaping vehicle comprising:
a vehicle; and
an adjustable earth shaping blade according to claim 1 connected to the vehicle.

33. The adjustable earth shaping blade of claim 32, wherein the angle of the pivotal axis is between 30° and 60°.

34. The adjustable earth shaping blade of claim 33, wherein the angle of the pivotal axis is 45°.

* * * * *